(12) United States Patent
Bowman et al.

(10) Patent No.: US 12,385,233 B2
(45) Date of Patent: Aug. 12, 2025

(54) FLUID FLUSHING SYSTEM

(71) Applicant: Mueller International, LLC, Atlanta, GA (US)

(72) Inventors: Clay Evan Bowman, Ooltewah, TN (US); Harold Thomas Mosley, Ooltewah, TN (US); Timothy Bain Ervin, Apison, TN (US)

(73) Assignee: Mueller International, LLC, Atlanta, GA (US)

( * ) Notice: Subject to any disclaimer, the term of this patent is extended or adjusted under 35 U.S.C. 154(b) by 0 days.

(21) Appl. No.: 18/215,225

(22) Filed: Jun. 28, 2023

(65) Prior Publication Data

US 2023/0340763 A1    Oct. 26, 2023

Related U.S. Application Data

(63) Continuation of application No. 16/930,962, filed on Jul. 16, 2020, now Pat. No. 11,725,366.

(51) Int. Cl.
*E03B 7/00* (2006.01)
*B08B 9/032* (2006.01)
(Continued)

(52) U.S. Cl.
CPC ............ *E03B 7/006* (2013.01); *B08B 9/0325* (2013.01); *C02F 1/008* (2013.01); *C02F 1/687* (2013.01); *C02F 1/70* (2013.01); *G01K 1/024* (2013.01); *G01L 19/0007* (2013.01); *G01L 19/086* (2013.01); *B08B 2209/032* (2013.01);
(Continued)

(58) Field of Classification Search
None
See application file for complete search history.

(56) References Cited

U.S. PATENT DOCUMENTS

| 1,661,265 A | 3/1928 | Olbricht |
| 1,788,618 A | 1/1931 | Cover |

(Continued)

FOREIGN PATENT DOCUMENTS

| AU | 2009308949 | 5/2010 |
| AU | 2010249499 | 5/2015 |

(Continued)

OTHER PUBLICATIONS

US 10,101,311 B2, 10/2018, Clark et al. (withdrawn)
(Continued)

*Primary Examiner* — Richard C Gurtowski
(74) *Attorney, Agent, or Firm* — Taylor Duma LLP

(57) ABSTRACT

A fluid flushing system includes a sampling port comprising a sampling conduit configured to dispense a sample of a fluid in the fluid routing assembly; a valve configurable in an open valve configuration, wherein the fluid is permitted to flow through the fluid flushing system, and a closed valve configuration, wherein the fluid is prohibited from flowing through the fluid flushing system; and a backflow preventer disposed between the sampling port and the valve, the backflow preventer configured to allow the fluid to flow in a first direction through the fluid flushing system towards the valve and to prevent the fluid from flowing in an opposite second direction through the fluid flushing system towards the sampling port.

17 Claims, 6 Drawing Sheets

(51) Int. Cl.
    *C02F 1/00*            (2023.01)
    *C02F 1/68*            (2023.01)
    *C02F 1/70*            (2023.01)
    *G01K 1/024*          (2021.01)
    *G01L 19/00*          (2006.01)
    *G01L 19/08*          (2006.01)
    *C02F 101/12*         (2006.01)

(52) U.S. Cl.
    CPC .... *C02F 2101/12* (2013.01); *C02F 2201/005* (2013.01); *C02F 2209/008* (2013.01); *C02F 2209/02* (2013.01); *C02F 2209/03* (2013.01)

(56) References Cited

U.S. PATENT DOCUMENTS

| | | |
|---|---|---|
| 1,901,772 A | 3/1933 | Pfau |
| 2,099,479 A | 11/1937 | Heinkel |
| 2,336,450 A | 12/1943 | Voorhess et al. |
| 2,524,031 A | 10/1950 | Arps |
| 2,828,762 A | 4/1958 | Swank |
| 2,931,383 A | 4/1960 | Harold |
| 3,047,079 A | 7/1962 | Wepsala, Jr. |
| 3,077,937 A | 2/1963 | Tirapolsky et al. |
| 3,084,515 A | 4/1963 | Dougherty |
| 3,128,998 A | 4/1964 | Sibley |
| 3,391,735 A | 7/1968 | Schramm et al. |
| 3,404,738 A | 10/1968 | Lindquist |
| 3,537,471 A | 11/1970 | Houle |
| 3,602,603 A | 8/1971 | Fukasu et al. |
| 3,705,385 A | 12/1972 | Batz |
| 4,039,784 A | 8/1977 | Quarton |
| 4,093,997 A | 6/1978 | Germer |
| 4,120,031 A | 10/1978 | Kincheloe et al. |
| 4,149,676 A | 4/1979 | Wieck |
| 4,282,413 A | 8/1981 | Simons |
| 4,291,375 A | 9/1981 | Wolf |
| 4,388,690 A | 6/1983 | Lumsden |
| 4,414,633 A | 11/1983 | Churchill |
| 4,442,492 A | 4/1984 | Karlsson et al. |
| 4,465,970 A | 8/1984 | Dimassimo et al. |
| 4,491,186 A | 1/1985 | Alder |
| 4,516,213 A | 5/1985 | Gidden |
| 4,520,516 A | 6/1985 | Parsons |
| 4,542,469 A | 9/1985 | Brandberry et al. |
| 4,591,988 A | 5/1986 | Klima et al. |
| 4,631,967 A | 12/1986 | Welker |
| 4,674,279 A | 6/1987 | Ali et al. |
| 4,705,060 A | 11/1987 | Goulbourne |
| 4,707,852 A | 11/1987 | Jahr et al. |
| 4,727,900 A | 3/1988 | Dooling et al. |
| 4,792,946 A | 12/1988 | Mayo |
| 4,803,632 A | 2/1989 | Frew et al. |
| 4,833,618 A | 5/1989 | Verma et al. |
| 4,868,566 A | 9/1989 | Strobel et al. |
| 4,881,070 A | 11/1989 | Burrowes et al. |
| 4,940,976 A | 7/1990 | Gastouniotis et al. |
| 4,945,344 A | 7/1990 | Farrell |
| 4,989,830 A | 2/1991 | Ratnik |
| 5,006,240 A | 4/1991 | Steffero, Sr. |
| 5,056,107 A | 10/1991 | Johnson et al. |
| 5,075,792 A | 12/1991 | Brown et al. |
| 5,079,715 A | 1/1992 | Venkataraman et al. |
| 5,095,705 A | 3/1992 | Daly |
| 5,121,344 A | 6/1992 | Laage et al. |
| 5,239,575 A | 8/1993 | White et al. |
| 5,298,894 A | 3/1994 | Cerny et al. |
| 5,327,925 A | 7/1994 | Ortel |
| 5,381,136 A | 1/1995 | Powers et al. |
| 5,434,911 A | 7/1995 | Gray et al. |
| 5,438,329 A | 8/1995 | Gastouniotis et al. |
| 5,451,938 A | 9/1995 | Brennan, Jr. |
| 5,459,459 A | 10/1995 | Lee |
| 5,481,259 A | 1/1996 | Bane |
| 5,493,287 A | 2/1996 | Bane |
| 5,525,898 A | 6/1996 | Lee et al. |
| 5,553,094 A | 9/1996 | Johnson et al. |
| 5,588,462 A | 12/1996 | McHugh |
| 5,590,179 A | 12/1996 | Shincovich et al. |
| 5,594,740 A | 1/1997 | LaDue |
| 5,617,084 A | 4/1997 | Sears |
| 5,631,554 A | 5/1997 | Briese et al. |
| 5,634,488 A | 6/1997 | Martin, Jr. |
| 5,646,863 A | 7/1997 | Morton |
| 5,654,692 A | 8/1997 | Baxter, Jr. et al. |
| 5,673,252 A | 9/1997 | Johnson et al. |
| 5,708,195 A | 1/1998 | Kurisu et al. |
| 5,714,931 A | 2/1998 | Petite |
| 5,748,104 A | 5/1998 | Argyroudis et al. |
| 5,751,797 A | 5/1998 | Saadeh |
| 5,757,357 A | 5/1998 | Grande et al. |
| 5,801,643 A | 9/1998 | Williams et al. |
| 5,815,086 A | 9/1998 | Ivie et al. |
| 5,839,508 A | 11/1998 | Tubel et al. |
| 5,852,658 A | 12/1998 | Knight et al. |
| 5,877,703 A | 3/1999 | Bloss et al. |
| 5,892,758 A | 4/1999 | Argyroudis |
| 5,901,738 A | 5/1999 | Miller |
| 5,907,491 A | 5/1999 | Canada et al. |
| 5,924,051 A | 7/1999 | Provost et al. |
| 5,926,103 A | 7/1999 | Petite |
| 5,926,531 A | 7/1999 | Petite |
| 5,940,009 A | 8/1999 | Loy et al. |
| 5,963,146 A | 10/1999 | Johnson et al. |
| 5,971,011 A | 10/1999 | Price |
| 5,993,739 A | 11/1999 | Lyon |
| 5,994,892 A | 11/1999 | Turino et al. |
| 6,006,212 A | 12/1999 | Schleich et al. |
| 6,028,522 A | 2/2000 | Petite |
| 6,031,455 A | 2/2000 | Grube et al. |
| 6,036,401 A | 3/2000 | Morina et al. |
| 6,044,062 A | 3/2000 | Brownrigg et al. |
| 6,058,374 A | 5/2000 | Guthrie et al. |
| 6,060,994 A | 5/2000 | Chen |
| 6,078,269 A | 6/2000 | Markwell |
| 6,081,204 A | 6/2000 | Lavoie et al. |
| 6,163,276 A | 12/2000 | Irving et al. |
| 6,172,616 B1 | 1/2001 | Johnson et al. |
| 6,194,902 B1 | 2/2001 | Kuo et al. |
| 6,195,018 B1 | 2/2001 | Ragle et al. |
| 6,218,953 B1 | 4/2001 | Petite |
| 6,233,327 B1 | 5/2001 | Petite |
| 6,246,677 B1 | 6/2001 | Nap et al. |
| 6,249,516 B1 | 6/2001 | Brownrigg et al. |
| 6,288,641 B1 | 9/2001 | Casais |
| 6,317,051 B1 | 11/2001 | Cohen |
| 6,333,975 B1 | 12/2001 | Brunn et al. |
| 6,356,205 B1 | 3/2002 | Salvo et al. |
| 6,373,399 B1 | 4/2002 | Johnson et al. |
| 6,392,538 B1 | 5/2002 | Shere |
| 6,424,270 B1 | 7/2002 | Ali |
| 6,430,268 B1 | 8/2002 | Petite |
| 6,437,692 B1 | 8/2002 | Petite et al. |
| 6,453,247 B1 | 9/2002 | Hunaidi |
| 6,456,197 B1 | 9/2002 | Lauritsen et al. |
| 6,470,903 B2 | 10/2002 | Reyman |
| 6,487,457 B1 | 11/2002 | Hull et al. |
| 6,493,377 B2 | 12/2002 | Schilling et al. |
| 6,512,463 B1 | 1/2003 | Campbell et al. |
| 6,528,957 B1 | 3/2003 | Luchaco |
| 6,538,577 B1 | 3/2003 | Ehrke et al. |
| 6,560,543 B2 | 5/2003 | Wolfe et al. |
| 6,564,159 B1 | 5/2003 | Lavoie et al. |
| 6,577,961 B1 | 6/2003 | Hubbard et al. |
| 6,618,578 B1 | 9/2003 | Petite |
| 6,624,750 B1 | 9/2003 | Marman et al. |
| 6,628,207 B1 | 9/2003 | Hemminger et al. |
| 6,628,764 B1 | 9/2003 | Petite |
| 6,633,781 B1 | 10/2003 | Lee et al. |
| 6,653,945 B2 | 11/2003 | Johnson et al. |
| 6,657,552 B2 | 12/2003 | Belski et al. |
| 6,675,071 B1 | 1/2004 | Griffin, Jr. et al. |
| 6,675,834 B1 | 1/2004 | Lai |
| 6,677,861 B1 | 1/2004 | Henry et al. |

(56) References Cited

U.S. PATENT DOCUMENTS

| | | |
|---|---|---|
| 6,710,721 B1 | 3/2004 | Holowick |
| 6,747,557 B1 | 6/2004 | Petite et al. |
| 6,798,352 B2 | 9/2004 | Holowick |
| 6,816,072 B2 | 11/2004 | Zoratti |
| 6,830,061 B2 | 12/2004 | Adams et al. |
| 6,836,737 B2 | 12/2004 | Petite et al. |
| 6,847,300 B2 | 1/2005 | Yee et al. |
| 6,876,100 B2 | 4/2005 | Yumita |
| 6,891,477 B2 | 5/2005 | Aronstam |
| 6,891,838 B1 | 5/2005 | Petite et al. |
| 6,914,533 B2 | 7/2005 | Petite |
| 6,914,893 B2 | 7/2005 | Petite |
| 6,931,445 B2 | 8/2005 | Davis |
| 6,946,972 B2 | 9/2005 | Mueller et al. |
| 6,954,701 B2 | 10/2005 | Wolfe |
| 6,954,814 B1 | 10/2005 | Leach |
| 6,963,808 B1 | 11/2005 | Addink et al. |
| 6,963,817 B2 | 11/2005 | Ito et al. |
| 6,970,808 B2 | 11/2005 | Abhulimen et al. |
| 6,972,677 B2 | 12/2005 | Coulthard |
| 6,978,210 B1 | 12/2005 | Suter et al. |
| 6,980,079 B1 | 12/2005 | Shintani et al. |
| 6,998,724 B2 | 2/2006 | Johansen et al. |
| 7,002,481 B1 | 2/2006 | Crane et al. |
| 7,008,239 B1 | 3/2006 | Ju |
| 7,009,530 B2 | 3/2006 | Zigdon et al. |
| 7,012,546 B1 | 3/2006 | Zigdon et al. |
| 7,020,701 B1 | 3/2006 | Gelvin et al. |
| 7,042,368 B2 | 5/2006 | Patterson et al. |
| 7,053,767 B2 | 5/2006 | Petite et al. |
| 7,054,271 B2 | 5/2006 | Brownrigg |
| 7,061,924 B1 | 6/2006 | Durrant et al. |
| 7,072,945 B1 | 7/2006 | Nieminen et al. |
| 7,079,810 B2 | 7/2006 | Petite et al. |
| 7,088,239 B2 | 8/2006 | Basinger et al. |
| 7,089,125 B2 | 8/2006 | Sonderegger |
| 7,103,511 B2 | 9/2006 | Petite |
| 7,117,051 B2 | 10/2006 | Landry et al. |
| 7,124,184 B2 | 10/2006 | Chung et al. |
| 7,137,550 B1 | 11/2006 | Petite |
| 7,142,107 B2 | 11/2006 | Kates |
| 7,201,180 B2 | 4/2007 | Ephrat et al. |
| 7,219,553 B1 | 5/2007 | Worthington |
| 7,248,181 B2 | 7/2007 | Patterson et al. |
| 7,252,431 B1 | 8/2007 | Caramanna |
| 7,253,536 B2 | 8/2007 | Fujimoto et al. |
| 7,256,704 B2 | 8/2007 | Yoon et al. |
| 7,263,073 B2 | 8/2007 | Petite et al. |
| 7,290,450 B2 | 11/2007 | Brown et al. |
| 7,292,143 B2 | 11/2007 | Drake et al. |
| 7,295,128 B2 | 11/2007 | Petite |
| 7,301,456 B2 | 11/2007 | Han |
| 7,310,590 B1 | 12/2007 | Bansal |
| 7,315,257 B2 | 1/2008 | Patterson et al. |
| 7,330,796 B2 | 2/2008 | Addink et al. |
| 7,342,504 B2 | 3/2008 | Crane et al. |
| 7,353,280 B2 | 4/2008 | Chiles et al. |
| 7,356,614 B2 | 4/2008 | Kim et al. |
| 7,363,031 B1 | 4/2008 | Aisa |
| 7,397,907 B2 | 7/2008 | Petite |
| 7,417,557 B2 | 8/2008 | Osterloh et al. |
| 7,423,985 B1 | 9/2008 | Hill |
| 7,424,527 B2 | 9/2008 | Petite |
| 7,443,313 B2 | 10/2008 | Davis et al. |
| 7,444,401 B1 | 10/2008 | Keyghobad et al. |
| 7,453,373 B2 | 11/2008 | Cumeralto et al. |
| 7,468,661 B2 | 12/2008 | Petite et al. |
| 7,478,108 B2 | 1/2009 | Townsend et al. |
| 7,480,501 B2 | 1/2009 | Petite |
| 7,497,957 B2 | 3/2009 | Bernard |
| 7,523,016 B1 | 4/2009 | Surdulescu et al. |
| 7,526,539 B1 | 4/2009 | Hsu |
| 7,550,746 B2 | 6/2009 | Tokhtuev et al. |
| 7,650,425 B2 | 1/2010 | Davis |
| 7,697,492 B2 | 4/2010 | Petite |
| 7,739,378 B2 | 6/2010 | Petite |
| 7,752,309 B2 | 7/2010 | Keyghobad et al. |
| 7,756,086 B2 | 7/2010 | Petite |
| 7,767,093 B2 | 8/2010 | Frank |
| 7,783,738 B2 | 8/2010 | Keyghobad et al. |
| 7,792,946 B2 | 9/2010 | Keyghobad et al. |
| 7,870,080 B2 | 1/2011 | Budike, Jr. |
| 7,880,641 B2 | 2/2011 | Parris et al. |
| 7,920,983 B1 | 4/2011 | Peleg |
| 7,980,317 B1 | 7/2011 | Preta et al. |
| 8,082,945 B1 | 12/2011 | White et al. |
| 8,109,131 B2 | 2/2012 | Winter |
| 8,140,667 B2 | 3/2012 | Keyghobad et al. |
| 8,249,042 B2 | 8/2012 | Sparr et al. |
| 8,341,106 B1 | 12/2012 | Scolnicov et al. |
| 8,351,409 B2 | 1/2013 | Albert et al. |
| 8,360,720 B2 | 1/2013 | Schlabach et al. |
| 8,407,333 B2 | 3/2013 | Keyghobad |
| 8,423,637 B2 | 4/2013 | Vaswani et al. |
| 8,549,131 B2 | 10/2013 | Keyghobad et al. |
| 8,583,386 B2 | 11/2013 | Armon et al. |
| 8,615,374 B1 | 12/2013 | Discenzo |
| 8,823,509 B2 | 9/2014 | Hyland et al. |
| 9,053,519 B2 | 6/2015 | Scolnicov et al. |
| 9,104,189 B2 | 8/2015 | Berges Gonzalez et al. |
| 9,134,204 B2 | 9/2015 | Mohajer |
| 9,202,362 B2 | 12/2015 | Hyland et al. |
| 9,441,988 B2 | 9/2016 | Armon et al. |
| 9,568,391 B2 | 2/2017 | Linford et al. |
| 9,568,392 B2 | 2/2017 | Peleg et al. |
| 9,588,094 B2 | 3/2017 | Wolfe |
| 9,604,858 B2 | 3/2017 | Kamen et al. |
| 9,749,792 B2 | 8/2017 | Klicpera |
| 9,760,097 B2 | 9/2017 | Masias et al. |
| 9,777,457 B2 | 10/2017 | Mosley |
| 9,799,204 B2 | 10/2017 | Hyland et al. |
| 9,822,519 B2 | 11/2017 | Hall et al. |
| 9,863,425 B2 | 1/2018 | Kallesoe et al. |
| 9,934,670 B2 | 4/2018 | Hyland et al. |
| 9,952,605 B2 | 4/2018 | Griffin, Jr. et al. |
| 10,030,818 B2 | 7/2018 | Hoskins et al. |
| 10,180,414 B2 | 1/2019 | Clark et al. |
| 10,193,778 B2 | 1/2019 | Vaswani et al. |
| 10,203,315 B2 | 2/2019 | Clark et al. |
| 10,242,414 B2 | 3/2019 | Scolnicov et al. |
| 10,262,518 B2 | 4/2019 | Hyland et al. |
| 10,402,044 B2 | 9/2019 | Rose et al. |
| 10,410,501 B2 | 9/2019 | Klicpera |
| 10,489,038 B2 | 11/2019 | Klicpera |
| 10,508,966 B2 | 12/2019 | Tooms et al. |
| 10,564,802 B2 | 2/2020 | Rose et al. |
| 10,571,358 B2 | 2/2020 | Campan et al. |
| 10,837,858 B2 | 11/2020 | Seddiq et al. |
| 11,041,839 B2 | 6/2021 | Gifford et al. |
| 11,255,835 B2 | 2/2022 | Clark et al. |
| 11,307,190 B2 | 4/2022 | Clark et al. |
| 11,725,366 B2 | 8/2023 | Bowman et al. |
| 12,253,507 B2 | 3/2025 | Clark et al. |
| 2001/0010032 A1 | 7/2001 | Ehlers et al. |
| 2001/0013488 A1 | 8/2001 | Fukunaga et al. |
| 2001/0024163 A1 | 9/2001 | Petite |
| 2001/0048030 A1 | 12/2001 | Sharood et al. |
| 2002/0002425 A1 | 1/2002 | Dossey et al. |
| 2002/0013679 A1 | 1/2002 | Petite |
| 2002/0019725 A1 | 2/2002 | Petite |
| 2002/0031101 A1 | 3/2002 | Petite |
| 2002/0043969 A1 | 4/2002 | Duncan |
| 2002/0062392 A1 | 5/2002 | Nishikawa et al. |
| 2002/0067717 A1 | 6/2002 | Raschke et al. |
| 2002/0073183 A1 | 6/2002 | Yoon et al. |
| 2002/0077777 A1 | 6/2002 | Wolfe et al. |
| 2002/0089802 A1 | 7/2002 | Beckwith |
| 2002/0105346 A1 | 8/2002 | Banks |
| 2002/0130069 A1 | 9/2002 | Moskoff |
| 2002/0130768 A1 | 9/2002 | Che et al. |
| 2002/0149487 A1 | 10/2002 | Haines et al. |
| 2002/0154029 A1 | 10/2002 | Watters et al. |
| 2002/0169643 A1 | 11/2002 | Petite et al. |

(56) References Cited

U.S. PATENT DOCUMENTS

| | | |
|---|---|---|
| 2002/0179508 A1* | 12/2002 | Nachtman ............... C02F 9/20 210/136 |
| 2002/0190956 A1 | 12/2002 | Klein et al. |
| 2003/0009515 A1 | 1/2003 | Lee et al. |
| 2003/0018733 A1 | 1/2003 | Yoon et al. |
| 2003/0018776 A1 | 1/2003 | Yoon et al. |
| 2003/0036810 A1 | 2/2003 | Petite |
| 2003/0046377 A1 | 3/2003 | Daum et al. |
| 2003/0074109 A1 | 4/2003 | Jeong et al. |
| 2003/0093484 A1 | 5/2003 | Petite |
| 2003/0107485 A1 | 6/2003 | Zoratti |
| 2003/0174070 A1 | 9/2003 | Garrod et al. |
| 2004/0006513 A1 | 1/2004 | Wolfe |
| 2004/0010561 A1 | 1/2004 | Kim et al. |
| 2004/0054747 A1 | 3/2004 | Breh et al. |
| 2004/0064217 A1 | 4/2004 | Addink et al. |
| 2004/0129312 A1 | 7/2004 | Cuzzo et al. |
| 2004/0138840 A1 | 7/2004 | Wolfe |
| 2004/0139210 A1 | 7/2004 | Lee et al. |
| 2004/0154965 A1 | 8/2004 | Baum et al. |
| 2004/0158333 A1 | 8/2004 | Ha et al. |
| 2004/0159149 A1 | 8/2004 | Williams et al. |
| 2004/0183687 A1 | 9/2004 | Petite et al. |
| 2004/0199340 A1 | 10/2004 | Kersey et al. |
| 2004/0212510 A1 | 10/2004 | Aronstam |
| 2004/0237545 A1 | 12/2004 | Tanaka et al. |
| 2005/0007249 A1 | 1/2005 | Eryurek et al. |
| 2005/0009192 A1 | 1/2005 | Page |
| 2005/0084418 A1 | 4/2005 | Hill et al. |
| 2005/0096753 A1 | 5/2005 | Arling |
| 2005/0104747 A1 | 5/2005 | Silic et al. |
| 2005/0118704 A1 | 6/2005 | Malobabic |
| 2005/0120778 A1 | 6/2005 | Von Herzen et al. |
| 2005/0159823 A1 | 7/2005 | Hayes |
| 2005/0195768 A1 | 9/2005 | Petite et al. |
| 2005/0195775 A1 | 9/2005 | Petite et al. |
| 2005/0201379 A1 | 9/2005 | Zhang et al. |
| 2005/0201397 A1 | 9/2005 | Petite |
| 2005/0203647 A1 | 9/2005 | Landry et al. |
| 2005/0247114 A1 | 11/2005 | Kahn |
| 2005/0251366 A1 | 11/2005 | Kahn et al. |
| 2005/0251367 A1 | 11/2005 | Kahn et al. |
| 2005/0275527 A1 | 12/2005 | Kates |
| 2005/0279169 A1 | 12/2005 | Ander |
| 2006/0028355 A1 | 2/2006 | Patterson et al. |
| 2006/0031040 A1 | 2/2006 | Wolfe |
| 2006/0041655 A1 | 2/2006 | Holloway et al. |
| 2006/0046664 A1 | 3/2006 | Paradiso et al. |
| 2006/0059977 A1 | 3/2006 | Kates |
| 2006/0098576 A1 | 5/2006 | Brownrigg et al. |
| 2006/0122736 A1 | 6/2006 | Alexanian |
| 2006/0158347 A1 | 7/2006 | Roche et al. |
| 2006/0174707 A1 | 8/2006 | Zhang |
| 2006/0181414 A1 | 8/2006 | Bandy et al. |
| 2006/0197345 A1 | 9/2006 | Kuroki et al. |
| 2006/0201550 A1 | 9/2006 | Blyth et al. |
| 2006/0218266 A1 | 9/2006 | Matsumoto et al. |
| 2006/0226970 A1 | 10/2006 | Saga et al. |
| 2006/0248961 A1 | 11/2006 | Shachar |
| 2006/0272830 A1 | 12/2006 | Fima |
| 2006/0273896 A1 | 12/2006 | Kates |
| 2007/0035315 A1 | 2/2007 | Hilleary |
| 2007/0050157 A1 | 3/2007 | Kahn et al. |
| 2007/0052540 A1 | 3/2007 | Hall et al. |
| 2007/0059986 A1 | 3/2007 | Rockwell |
| 2007/0063866 A1 | 3/2007 | Webb |
| 2007/0090059 A1 | 4/2007 | Plummer et al. |
| 2007/0163965 A1 | 7/2007 | Wolfe |
| 2007/0219728 A1 | 9/2007 | Papageorgiou et al. |
| 2007/0293990 A1 | 12/2007 | Alexanian |
| 2007/0298779 A1 | 12/2007 | Wolman et al. |
| 2008/0030319 A1 | 2/2008 | McKeena et al. |
| 2008/0095403 A1 | 4/2008 | Benhammou |
| 2008/0109090 A1 | 5/2008 | Esmaili et al. |
| 2008/0109175 A1 | 5/2008 | Michalak |
| 2008/0110267 A1* | 5/2008 | Sheikh-Bahaie ... B60C 23/0496 73/700 |
| 2008/0122641 A1 | 5/2008 | Amidi |
| 2008/0136191 A1 | 6/2008 | Baarman et al. |
| 2008/0143109 A1 | 6/2008 | Pitchford et al. |
| 2008/0155064 A1 | 6/2008 | Kosuge |
| 2008/0186898 A1 | 8/2008 | Petite |
| 2008/0195329 A1 | 8/2008 | Prince et al. |
| 2008/0289402 A1 | 11/2008 | Chowdhury |
| 2008/0291054 A1 | 11/2008 | Groft |
| 2009/0040057 A1 | 2/2009 | Keyghobad |
| 2009/0066524 A1 | 3/2009 | Yukawa et al. |
| 2009/0068947 A1 | 3/2009 | Petite |
| 2009/0084734 A1 | 4/2009 | Yencho |
| 2009/0099701 A1 | 4/2009 | Li et al. |
| 2009/0121860 A1 | 5/2009 | Kimmel et al. |
| 2009/0123340 A1 | 5/2009 | Knudsen et al. |
| 2009/0125241 A1 | 5/2009 | Frank |
| 2009/0157521 A1 | 6/2009 | Moren |
| 2009/0204265 A1 | 8/2009 | Hackett |
| 2009/0215424 A1 | 8/2009 | Petite |
| 2009/0243840 A1 | 10/2009 | Petite et al. |
| 2009/0260697 A1 | 10/2009 | Mevius et al. |
| 2009/0281677 A1 | 11/2009 | Botich et al. |
| 2009/0287838 A1 | 11/2009 | Keyghobad et al. |
| 2009/0287966 A1 | 11/2009 | Keyghobad |
| 2009/0301571 A1 | 12/2009 | Ruhs |
| 2009/0309755 A1 | 12/2009 | Williamson et al. |
| 2009/0319853 A1 | 12/2009 | Keyghobad |
| 2010/0017465 A1 | 1/2010 | Brownrigg et al. |
| 2010/0039984 A1 | 2/2010 | Brownrigg |
| 2010/0085211 A1 | 4/2010 | Wang et al. |
| 2010/0105146 A1 | 4/2010 | Meeusen |
| 2010/0193430 A1 | 8/2010 | Whiteman |
| 2010/0194582 A1 | 8/2010 | Petite |
| 2010/0204924 A1 | 8/2010 | Wolfe et al. |
| 2010/0214120 A1 | 8/2010 | Means |
| 2010/0250054 A1 | 9/2010 | Petite |
| 2010/0265909 A1 | 10/2010 | Petite et al. |
| 2010/0312881 A1 | 12/2010 | Davis et al. |
| 2010/0313958 A1 | 12/2010 | Patel et al. |
| 2010/0332149 A1 | 12/2010 | Scholpp |
| 2011/0030482 A1 | 2/2011 | Meeusen et al. |
| 2011/0044276 A1 | 2/2011 | Albert et al. |
| 2011/0059462 A1 | 3/2011 | Lim et al. |
| 2011/0093123 A1 | 4/2011 | Alexanian |
| 2011/0111700 A1 | 5/2011 | Hackett |
| 2011/0125412 A1 | 5/2011 | Salzer et al. |
| 2011/0132484 A1 | 6/2011 | Teach et al. |
| 2011/0178644 A1 | 7/2011 | Picton |
| 2011/0190947 A1 | 8/2011 | Savelle, Jr. et al. |
| 2011/0215945 A1 | 9/2011 | Peleg et al. |
| 2011/0233935 A1 | 9/2011 | Baarman et al. |
| 2011/0257788 A1 | 10/2011 | Wiemers et al. |
| 2011/0307203 A1 | 12/2011 | Higgins |
| 2011/0308638 A1 | 12/2011 | Hyland et al. |
| 2012/0016823 A1 | 1/2012 | Paillet et al. |
| 2012/0025997 A1 | 2/2012 | Liu et al. |
| 2012/0038170 A1 | 2/2012 | Stuart et al. |
| 2012/0048386 A1 | 3/2012 | Clark |
| 2012/0106518 A1 | 5/2012 | Albert et al. |
| 2012/0116827 A1 | 5/2012 | Susumago |
| 2012/0118397 A1 | 5/2012 | Novotny et al. |
| 2012/0121386 A1 | 5/2012 | Dahlhaug |
| 2012/0132445 A1 | 5/2012 | Mallon et al. |
| 2012/0191868 A1 | 7/2012 | Keyghobad |
| 2012/0206258 A1 | 8/2012 | Ramesh |
| 2012/0271686 A1 | 10/2012 | Silverman |
| 2012/0298208 A1 | 11/2012 | Taylor et al. |
| 2012/0298381 A1 | 11/2012 | Taylor |
| 2012/0311170 A1 | 12/2012 | Keyghobad et al. |
| 2013/0029683 A1 | 1/2013 | Kim et al. |
| 2013/0036800 A1 | 2/2013 | Mohajer |
| 2013/0041601 A1 | 2/2013 | Dintakurti et al. |
| 2013/0118239 A1 | 5/2013 | Forstmeier |
| 2013/0168327 A1 | 7/2013 | Clark |
| 2013/0170417 A1 | 7/2013 | Thomas et al. |
| 2013/0211797 A1 | 8/2013 | Scolnicov |
| 2013/0317659 A1 | 11/2013 | Thomas et al. |

(56) References Cited

U.S. PATENT DOCUMENTS

| | | |
|---|---|---|
| 2013/0332090 A1 | 12/2013 | Scolnicov et al. |
| 2013/0341934 A1 | 12/2013 | Kawanishi |
| 2014/0026644 A1 | 1/2014 | Patel et al. |
| 2014/0073238 A1 | 3/2014 | Henn et al. |
| 2014/0262998 A1 | 6/2014 | Wagner et al. |
| 2014/0224026 A1 | 8/2014 | Linford et al. |
| 2014/0278246 A1 | 9/2014 | Clark et al. |
| 2014/0290761 A1* | 10/2014 | Apostolides .......... F15B 21/005 137/511 |
| 2014/0340238 A1 | 11/2014 | Hyland |
| 2015/0198057 A1 | 7/2015 | Hanna |
| 2015/0308627 A1 | 10/2015 | Hoskins |
| 2015/0327449 A1 | 11/2015 | Bartlett et al. |
| 2016/0049067 A1 | 2/2016 | Hyland |
| 2016/0163177 A1 | 6/2016 | Klicpera |
| 2016/0356755 A1 | 12/2016 | Gifford |
| 2017/0059543 A1 | 3/2017 | Clark |
| 2017/0172078 A1 | 6/2017 | Gonzalez Hernandez et al. |
| 2017/0367578 A1 | 12/2017 | Melodia et al. |
| 2017/0370893 A1 | 12/2017 | West |
| 2018/0174424 A1 | 6/2018 | Hyland et al. |
| 2018/0372706 A1 | 12/2018 | Clark et al. |
| 2018/0372707 A1 | 12/2018 | Clark et al. |
| 2018/0372708 A1 | 12/2018 | Clark et al. |
| 2022/0018101 A1 | 1/2022 | Bowman et al. |
| 2022/0128538 A1 | 4/2022 | Clark et al. |
| 2024/0392541 A1 | 11/2024 | Bowman et al. |
| 2025/0101721 A1 | 3/2025 | Bowman et al. |

FOREIGN PATENT DOCUMENTS

| | | |
|---|---|---|
| AU | 2014259545 | 11/2015 |
| AU | 2015202223 | 9/2016 |
| AU | 2014235054 | 2/2018 |
| AU | 2018200410 | 1/2019 |
| AU | 2018253559 | 11/2020 |
| AU | 2020257082 | 9/2022 |
| CA | 2634759 | 12/2009 |
| CA | 2741843 | 5/2018 |
| CA | 2772545 | 12/2018 |
| CA | 2987661 | 4/2021 |
| CA | 2900965 | 9/2021 |
| CA | 3115584 | 9/2023 |
| CN | 1185838 | 6/1998 |
| CN | 1458405 | 11/2003 |
| CN | 2630512 | 8/2004 |
| CN | 101871834 | 10/2010 |
| CN | 102095837 | 6/2011 |
| CN | 204828756 | 12/2015 |
| DE | 4016529 | 11/1991 |
| DE | 4124154 | 1/1993 |
| DE | 202006017758 | 2/2007 |
| EP | 1901253 | 3/2008 |
| EP | 2433440 | 7/2018 |
| EP | 2350992 | 1/2019 |
| EP | 3422319 | 1/2019 |
| EP | 3422320 | 1/2019 |
| EP | 3422320 B1 | 1/2019 |
| GB | 2305333 | 4/1997 |
| GB | 2401406 | 11/2004 |
| GB | 2507184 | 4/2014 |
| JP | 62-295674 | 12/1987 |
| JP | 05-253316 | 10/1993 |
| JP | 06-223279 | 8/1994 |
| JP | 6300606 | 10/1994 |
| JP | H0731989 | 2/1995 |
| JP | 07-116285 | 5/1995 |
| JP | 07231363 | 8/1995 |
| JP | 2008128079 | 5/1996 |
| JP | 11-046254 | 2/1999 |
| JP | 2000285356 | 10/2000 |
| JP | 2001200952 | 7/2001 |
| JP | 2001254662 A | 9/2001 |
| JP | 2002014000 | 1/2002 |
| JP | 2002352361 | 12/2002 |
| JP | 2003172243 A | 6/2003 |
| JP | 2006285645 | 10/2006 |
| JP | 2008198044 | 8/2008 |
| JP | 2012507090 | 3/2012 |
| JP | 2012527706 | 11/2012 |
| JP | 2013200031 | 10/2013 |
| KR | 20110092242 | 8/2011 |
| WO | 9810299 | 3/1998 |
| WO | 9810394 | 3/1998 |
| WO | 03067021 | 8/2003 |
| WO | 2008087911 | 7/2008 |
| WO | 2009012254 | 1/2009 |
| WO | 2009100476 | 8/2009 |
| WO | 2010004255 | 1/2010 |
| WO | 2010051287 | 5/2010 |
| WO | 2010099348 | 9/2010 |
| WO | 2010135587 | 11/2010 |
| WO | 2012069688 | 5/2012 |
| WO | 2012099588 | 7/2012 |
| WO | 2014151384 | 9/2014 |
| WO | 2016197096 | 12/2016 |

OTHER PUBLICATIONS

US 11,262,343 B2, 03/2022, Clark et al. (withdrawn)
Gifford, Paul; Final Office Action for U.S. Appl. No. 15/171,722, filed Jun. 2, 2016, mailed Feb. 26, 2019, 18 pgs.
Gifford, Paul; Final Office Action for U.S. Appl. No. 15/171,722, filed Jun. 2, 2016, mailed Mar. 30, 2018, 15 pgs.
Gifford, Paul; Non-Final Office Action for U.S. Appl. No. 15/171,722, filed Jun. 2, 2016, mailed Oct. 16, 2017, 76 pgs.
Gifford, Paul; Non-Final Office Action for U.S. Appl. No. 15/171,722, filed Jun. 2, 2016, mailed Oct. 5, 2020, 39 pgs.
Gifford, Paul; Non-Final Office Action for U.S. Appl. No. 15/171,722, filed Jun. 2, 2016, mailed Nov. 17, 2017, 90 pgs.
Gifford, Paul; Non-Final Office Action for U.S. Appl. No. 15/171,722, filed Jun. 2, 2016, mailed Aug. 29, 2018, 16 pgs.
Gifford, Paul; Notice of Allowance for U.S. Appl. No. 15/171,722, filed Jun. 2, 2016, mailed Feb. 10, 2021, 26 pgs.
Gifford, Paul; Notification of Non-Compliant Appeal Brief for U.S. Appl. No. 15/171,722, filed Jun. 2, 2016, mailed Jun. 25, 2019, 2 pgs.
Splitz, David; International Preliminary Report on Patentability for serial No. PCT/US11/58260, filed Oct. 28, 2011, mailed May 8, 2014, 7 pgs.
Splitz, David; International Search Report and Written Opinion for serial No. PCT/US11/58260, filed Oct. 28, 2011, mailed Feb. 7, 2012, 8 pgs.
Splitz, David; International Preliminary Report on Patentability for serial No. PCT/US12/22060, filed Jan. 20, 2012, mailed May 8, 2014, 6 pgs.
Splitz, David; International Search Report and Written Opinion for serial No. PCT/US12/22060, filed Jan. 20, 2012, mailed Mar. 29, 2012, 8 pgs.
Splitz, David Edwin; Extended European Search Report for serial No. 12844451.0, filed Jan. 20, 2012, mailed Jan. 21, 2015, 8 pgs.
Clark, Kenneth A.; International Preliminary Report on Patentability for PCT/US2014/025617, filed Mar. 13, 2014, mailed Sep. 24, 2015, 12 pgs.
Clark, Kenneth A.; International Search Report and Written Opinion for serial No. PCT/US2014/025617, filed Mar. 13, 2014, mailed Aug. 27, 2014, 48 pgs.
Huang, et al.; "The Mahalanobis-Taguchi system—Neural network algorithm for data mining in dynamic environments", Extern Systems with Appklications (online), 2009 [retrieved on Aug. 13, 2014], vol. 36, pp. 5475-5480.
Clark, Kenneth A.; Extended European Search Report for serial No. 14771115.4, filed Mar. 13, 2014, mailed Sep. 14, 2016, 8 pgs.
Clark, Kenneth A.; Office Action for European patent application No. 14771115.4, filed Mar. 13, 2014, mailed Dec. 15, 2021, 5 pgs.
Clark, Kenneth A.; Summons to Attend Oral Proceedings for European patent application No. 14771115.4, filed Mar. 13, 2014, mailed Sep. 13, 2022, 6 pgs.

(56) References Cited

OTHER PUBLICATIONS

Hunaidi, et al., "A new System for locating leaks in urban water distribution pipes", International Journal of Management of Environmental Quality, Jan. 31, 2006, pp. 450-466, Retrieved from the internet: <http://web.mit.edu/parmstr/Public/NRCan/nrcc48357.pdf>, 19 pgs.
Palau, et al.; Article entitled: "Using Multivariate Principal Component Analysis of Injected Water Flows to Detect Anomalous Behaviors in a Water Supply System. A Case Study.", Water Science and Technology: Water Supply, vol. 4, No. 3, Jun. 30, 2004, 12 pgs.
Perelman, et al.; Article entitled: "Event Detection in Water Distribution Systems from Multivariate Water Quality Time Series", Environmental Science & Technology, vol. 46, No. 15, Aug. 7, 2012, 8 pgs.
Stoianov, et al.; Article entitled: "Sensor Networks for Monitoring Water Supply and Sewer Systems: Lessons from Boston", Water Distribution Systems Analysis Symposium 2006; Aug. 27-30, 2006, 17 pgs.
Clark, Kenneth A.; Office Action for Mexico Application No. MX/a/2015/011793, filed Mar. 13, 2014, mailed Feb. 20, 2017, 7 pgs.
Clark, Kenneth A.; Office Action for Mexico Application No. MX/a/2015/011793, filed Mar. 13, 2014, mailed Jun. 20, 2017, 8 ogs.
Clark, Kenneth A.; Office Action for Canadian application No. 2,900,965, filed Mar. 13, 2014, mailed Jan. 20, 2020, 5 pgs.
Clark, Kenneth A.; Office Action for Canadian application No. 2,900,965, filed Mar. 13, 2014, mailed Oct. 27, 2020, 4 pgs.
Clark, Kenneth A.; Office Action for Canadian application No. 2,900,965, filed Mar. 13, 2014, mailed Jun. 12, 2020, 4 pgs.
Clark, Kenneth A.; Office Action for Australian Application No. 2014235054, filed Mar. 13, 2014, mailed Jun. 2, 2017, 3 pgs.
Clark, Kenneth A.; Examination Report for Australian application No. 2018200410, filed Mar. 13, 2014, mailed Jun. 28, 2018, 4 pgs.
Clark, Kenneth A.; Examination Report for Australian patent application No. 2018253559, filed Mar. 13, 2014, mailed Jan. 17, 2020, 3 pgs.
Clark, Kenneth A.; Examination Report for Australian patent application No. 2018253559, filed Mar. 13, 2014, mailed Apr. 28, 2020, 3 pgs.
Clark, Kenneth A.; Examination Report for Australian patent application No. 2018253559, filed Mar. 13, 2014, mailed Jul. 8, 2019, 3 pgs.
Clark, Kenneth A.; Examination Report for Australian patent application No. 2020257082, filed Mar. 13, 2014, mailed Jan. 11, 2022, 8 pgs.
Clark, Kenneth A.; Examination Report for Australian patent application No. 2020257082, filed Mar. 13, 2014, mailed Oct. 26, 2021, 3pgs.
Onset Computer Corporation; Article entitled: HOBOLINK Printable Help; located at <https://www.onsetcomp.com/files/manual_pdfs/11969_E_MAN_HL_WH.pdf>, retrieved Jan. 11, 2022, published 2008, 112 pgs.
SensorsONE Measurement Instrumentation Products; Article entitled: "Triton Data Logger Series", retrieved from internet Jan. 11, 2022, <https://www.sensorsone.com/wp-content/uploads/2013/02/Triton-Series.pdf>, published Feb. 28, 2013, 5 pgs.
Clark, Kenneth A.; Extended European Search Report for application No. 23155054.2, filed Mar. 13, 2014, mailed Jun. 1, 2023, 13 pgs.
Hunaidi, et al.; Article entitled: "A New systems for locating leaks in urban water distribution pipes", International Journal of Management of Environmental Quality, Jan. 31, 2006, 19 pgs.
Palau, et al; Article entitled: "Using Multivariate Principal Component Analysis of Injected Water Flows to Detect Anomalous Behaviors in a Water Supply System. A Case Study", Water Science and Technology: Water Supply, vol. 4, Jun. 30, 2004, 12 pgs.
Perelman, et al.; Article entitled: "Event Detection in Water Distribution Systems from Multivariate Water Quality Time Series", Environmental Science & Technology, vol. 46, Aug. 7, 2012, 8 pgs.
Stoianov, et al.; Article entitled: "Sensor Networks for Monitoring Water Supply and Sewer Systems: Lessons From Boston", Water Distribution Systems Analysis Symposium 2006; Proceedings of the 8th Annual Water Distribution Systems Analysis Symposium, Aug. 27-30, 2006, 17 pgs.
Gifford, Paul; International Search Report and Written Opinion for PCT Application No. PCT/US16/36007, filed Jun. 6, 2016, mailed Oct. 6, 2016, 12 pgs.
Gifford, Paul; Notification Concerning International Preliminary Report on Patentability for PCT Application No. PCT/US16/36007, filed Jun. 6, 2016, mailed Dec. 14, 2017, 9 pgs.
Gifford, Paul S.; European Search Report for serial No. 16804634.0, filed Jun. 6, 2016, mailed Mar. 11, 2019, 19 pgs.
Gifford, Paul S.; European Search Report for serial No. 16804634.0, filed Jun. 6, 2016, mailed Jul. 25, 2019, 21 pgs.
Gifford, Paul S.; Office Action for European patent application No. 16804634.0, filed Jun. 6, 2016, mailed Jul. 26, 2023, 8 pgs.
Lambrou, et al.; Article entitled: "A Low-Cost Sensor Network for Real-Time Monitoring and Contamination Detection in Drinking Water Distribution Systems", IEEE Sensors Journal, vol. 14, No. 8, Aug. 2014, 9 pgs.
Shafiee, et al.; Article entitled: "Integrating Evolutionary Computation and Sociotechnical Simulation for Flushing Contaminated Water Distribution Systems", Genetic and Evolutionary Computation, ACM, Jul. 1, 2012, pp. 315-322 (8 pgs).
Whittle, et al; Article entitled: "WaterWise@SG: A Testbed for Continuous Monitoring of the Water Distribution System in Singapore", Water Distribution Analysis 2010, Dec. 21, 2011, 16, pgs.
Gifford, Paul S.; Office Action for Canadian patent application No. 2,987,661, filed Jun. 6, 2016, mailed Apr. 21, 2020, 3 pgs.
Gifford, Paul S.; Office Action for Canadian patent application No. 2,987,661, filed Jun. 6, 2016, mailed Aug. 17, 2020, 3 pgs.
Bowman, Clay Evan; Final Office Action for U.S. Appl. No. 16/930,962, filed Jul. 16, 2020, mailed Sep. 9, 2022, 27 pgs.
Bowman, Clay Evan; Non-Final Office Action for U.S. Appl. No. 16/930,962, filed Jul. 16, 2020, mailed Dec. 14, 2022, 11 pgs.
Bowman, Clay Evan; Non-Final Office Action for U.S. Appl. No. 16/930,962, filed Jul. 16, 2020, mailed Apr. 12, 2022, 129 pgs.
Bowman, Clay Evan; Notice of Allowance for U.S. Appl. No. 16/930,962, filed Jul. 16, 2020, mailed Mar. 27, 2023, 10 pgs.
Hyland, Gregory E.; European Search Report for Serial No. EP10778423.3, filed Nov. 18, 2011, mailed Apr. 10, 2017, 6 pgs.
Wikipedia; Article entitled: "Water turbine", located at (https://en.wikipedia.org/wiki/Water_turbine), 11 pgs.
"In Brief," Land Mobile Radio News, Jan. 16, 1998. vol. 52, No. 3, p. 1. [Accessed Dec. 29, 2011—ProQuest] http://proquest.umi.com/pqdweb?did=25435781&SID=1&Fmt=3&clientId=31810&RQT=309&VName%20=PQD.
"Landis & Gyr Utilities: Service Partnership Helps Utilities Use Available Resources More Effectively," www.landisgyr.com/utilities/e/fr_press1_e.htm (archived Feb. 6, 1998) http://web.archive.org/web/19980206060801/http://www.landisgyr.com/utilities.
Clark, Kenneth A.; Officed Action for Canadian patent application No. 3,115,584, filed Mar. 13, 2014, mailed Jul. 12, 2022, 4 pgs.
AMCO; "Pit Water-Meter Transponder (PWT)"; AMCO Automated Systems, LLC; PDB-14611; Sep. 2002; 2 pgs.
AMCO; Remote Water-Meter Transponder (PWT); AMCO Automated Systems, LLC; PDB-14610; Sep. 2002; 2 pgs.
AMCO; "Short-Range Programmer (SRP) VRT"; AMCO Automated Systems, LLC; PDB-14555.1; Sep. 2002; 2 pgs.
ANSI; "Protocol Specification for ANSI Type 2 Optical Port", American National Standard, ANSI C.12.18-2006, 11 pgs.
Article entitled: "Datamatic, Badger Connect for AMR Solutions", http://www.datamatic.com/badger_partnership.html; accessed on Jul. 27, 2012, 1 pg.
Article entitled: "OET Exhibits List", https://apps.fcc.gov/oetcf/eas/reports/ViewExhibitReport.cfm?mode=Exhibits&RequestTimeout=500&calledFromFrame=N&application_id=194044&fcc_id =; Feb. 20, 2001, 2 pgs.
Article entitled: "Remote Meter Reading", http://www.meter.co.uk/RMR.html; accessed on Jul. 30, 2012, 2 pgs.
De Almeida et al. "Advanced Monitoring Technologies for the Evaluation of Demand-Side Management Programs," IEEE Trans-

(56) References Cited

OTHER PUBLICATIONS actions on Power Systems, Aug. 1994. vol. 9, No. 3. [Accessed Dec. 29, 2011] http://ieeexplore.ieee.org/xpls/abs_all.jsp?arnumber= 336086.
Dolezilek. "Microprocessor Based Relay Information Improves the Power System," Rural Electric Power Conference, May 1999. p. B5/1-B5/9. [Accessed Dec. 29, 2011] http://ieeexplore.ieee.org/xpls/abs_all.jsp?arnumber=768685.
English Translation: Von Roll Hydro—Hyrdojournal, VonRoll Hydroalert—Provides a Warning in the Event of Any Tampering with the Water Supply, p. 3, Nov. 2008.
English Translation: Vonroll Hydro—Hyrdojournal, Technology with a Future for Shut-off Systems—p. 4, VonRoll Hydro (shop) GmbH—New Concepts for Apprentice Training—p. 12, May 2008.
Federal Communications Commission; "Understanding the FCC Regulations for Low-Power, Non-Licensed Transmitters", Office of Engineering and Technology; Oct. 1993; 34 pgs.
Gehami et al. "Electronic Control System | Salient Feature in Substation," Transmission & Distrubition, Mar. 1991. vol. 43, No. 3, p. 48. [Accessed Dec. 29, 2011—ProQuest].
General Electric; "GEH-5081 kV Meter Product Manual", Nov. 1997, 137 pgs.
General Electric; "kV RSX—RS232/RS485 Communications Options: Instructions Manual"; Mar. 1999, 33 pgs.
Horlent. "New Metering And Reading Techniques Based on a Modular Design Concept," 10th International Conference on Electricity Distribution, May 1989. vol. 5, p. 455-459. [Accessed Dec. 29, 2011—IEEExplore].
Orfield; "Badger® ORION® System Helps Lemmon, South Dakota Reduce Read Time, Billing Cycles", Badger Connect Publication, 2004, 2 pgs.
Patterson, Tim; Request for Ex Parte Reexamination under U.S. Appl. No. 90/012,449, filed Aug. 23, 2012; 51 pgs.
Patterson, Tim; Request for Ex Parte Reexamination under U.S. Appl. No. 90/012,468, filed Sep. 6, 2012; 52 pgs.
Radix Corporation; "Automatic Meter Reading", 2 pgs.
RFM; "HX 2000 Datasheet: 916.5 MHz: Hybrid Transmitter", RF Monolithics, Inc., Dallas, TX, USA, 1998; 2 pgs.
Semtech; "TN1200.4, Calculating Radiated Power and Field Strength for Conducted Power Measurements", Semtech Corporation, Camarillo, CA, 2007, 9 pgs.
Tamarkin. "Automated Meter Reading", Sep.-Oct. 1992, vol. 50, No. 5/ [Accessed Dec. 29, 2011] http://www.usclcorp.com/news/Automatic_Power_reading.pdf.
Trace; "Pit Water—Meter Transponder"; User Guide; Jan. 2003 16 pgs.
Von Roll Hydro—Hydrojournal, pp. 1-16, Nov. 2008.
Vonroll Hydro—Hydrojournal, pp. 1-16, May 2008.
Young et al. "Real-Time Intranet-Controlled Virtual Instrument Multiple-Circuit Power Monitoring," IEEE Transactions on Instrumentation and Measurement, Jun. 2000. vol. 49, No. 3, p. 570. [Accessed Dec. 29, 2011] http://ieeexplore.ieee.org/xpls/abs_all.jsp?.
Keyghobad, Seyamak; Certificate of Correction for U.S. Appl. No. 10/298,300, filed Nov. 18, 2002; mailed Mar. 31, 2009; 1 page.
Keyghobad, Seyamak; Examiner Interview Summary Record for U.S. Appl. No. 10/298,300, filed Nov. 18, 2002; mailed Feb. 5, 2008; 2 pages.
Keyghobad, Seyamak; Notice of Allowance for U.S. Appl. No. 12/490,925, filed Jun. 24, 2009; mailed Jun. 28, 2010; 10 pgs.
Hyland, Gregory E.; Office Action for European serial No. 18214263.8, filed Oct. 27, 2009, mailed Jul. 14, 2020, 5 pgs.
Hyland, Gregory E.; Office Action for European patent application No. 18184468.9, filed May 20, 2010, mailed Jul. 5, 2021 (received by European counsel for Applicant on Aug. 20, 2021), 6 pgs.
Hyland, Gregory E.; Office Action for European patent application No. 18184481.2, filed May 20, 2010, mailed Jul. 5, 2021 (received by European counsel for Applicant on Oct. 16, 2021), 7 pgs.
dictionary.com; definition of "turbine", accessed on Sep. 3, 2019, 1 pg.
Clark, Kenneth A.; Office Action for European serial No. 14771115.4, filed Mar. 13, 2014, mailed Sep. 9, 2020, 4 pgs.
Gifford, Paul S.; Office Action for European patent application No. 16804634.0, filed Jun. 6, 2016, mailed Dec. 9, 2021, 7 pgs.
Gifford, Paul S.; Office Action for Canadian patent application No. 2,987,661, filed Jun. 6, 2016, mailed Nov. 26, 2019, 4 pgs.
Hyland, Gregory E.; Applicant Initiated Interview Summary for U.S. Appl. No. 12/606,957, filed Oct. 27, 2009, mailed Feb. 18, 2014, 4 pgs.
Hyland, Gregory E.; Final Office Action for U.S. Appl. No. 12/606,957, filed Oct. 27, 2009, mailed Dec. 17, 2013, 54 pgs.
Hyland, Gregory E.; Final Office Action for U.S. Appl. No. 12/606,957, filed Oct. 27, 2009, mailed Apr. 10, 2013, 80 pgs.
Hyland, Gregory E.; Final Office Action for U.S. Appl. No. 12/606,957, filed Oct. 27, 2009, mailed Sep. 22, 2014, 49 pgs.
Hyland, Gregory E.; Issue Notification for U.S. Appl. No. 12/606,957, filed Oct. 27, 2009, mailed Nov. 11, 2015, 1 pg.
Hyland, Gregory E.; Non-Final Office Action for U.S. Appl. No. 12/606,957, filed Oct. 27, 2009, mailed Oct. 18, 2012; 44 pgs.
Hyland, Gregory E.; Non-Final Office Action for U.S. Appl. No. 12/606,957, filed Oct. 27, 2009, mailed Jan. 8, 2014, 43 pgs.
Hyland, Gregory E.; Non-Final Office Action for U.S. Appl. No. 12/606,957, filed Oct. 27, 2009, mailed Sep. 6, 2013; 53 pgs.
Hyland, Gregory E.; Non-Final Office Action for U.S. Appl. No. 12/606,957, filed Oct. 27, 2009, mailed Jan. 16, 2015, 47 pgs.
Hyland, Gregory E.; Notice of Allowance for U.S. Appl. No. 12/606,957, filed Oct. 27, 2009, mailed Jul. 27, 2015, 19 pgs.
Hyland, Gregory E.; Supplemental Notice of Allowability for U.S. Appl. No. 12/606,957, filed Oct. 27, 2009, mailed Oct. 13, 2015, 4 pgs.
Hyland, Gregory E.; Final Office Action for U.S. Continuation U.S. Appl. No. 14/928,725, filed Oct. 30, 2015, mailed Jul. 18, 2017, 51 pgs.
Hyland, Gregory E.; Issue Notification for U.S. Appl. No. 14/928,725, filed Oct. 30, 2015, mailed Mar. 14, 2018, 1 pg.
Hyland, Gregory E.; Non-final Office Action for U.S. Appl. No. 14/928,725, filed Oct. 30, 2015, mailed Jan. 25, 2017, 137 pgs.
Hyland, Gregory E.; Notice of Allowance for U.S. Appl. No. 14/928,725, filed Oct. 30, 2015, mailed Nov. 30, 2017, 22 pgs.
Hyland, Gregory E.; Supplemental Notice of Allowance for U.S. Appl. No. 14/928,725, filed Oct. 30, 2015, mailed Dec. 28, 2017, 6 pgs.
Hyland, Gregory E.; Supplemental Notice of Allowance for U.S. Appl. No. 14/928,725, filed Oct. 30, 2015, mailed Feb. 27, 2018, 6 pgs.
Hyland, Gregory E.; Corrected Notice of Allowance for U.S. Appl. No. 15/895,062, filed Feb. 13, 2018, mailed Mar. 6, 2019, 7 pgs.
Hyland, Gregory E.; Issue Notification for U.S. Appl. No. 15/895,062, filed Feb. 13, 2018, mailed Mar. 27, 2019, 1 pg.
Hyland, Gregory E.; Non-Final Office Action for U.S. Appl. No. 15/895,062, filed Feb. 13, 2018, mailed Oct. 25, 2018, 72 pgs.
Hyland, Gregory E.; Notice of Allowance for U.S. Appl. No. 15/895,062, filed Feb. 13, 2018, mailed Dec. 26, 2018, 11 pgs.
Hyland, Gregory E.; Final Office Action for U.S. Appl. No. 12/784,300, filed May 20, 2010, mailed Feb. 11, 2014; 44 pgs.
Hyland, Gregory E.; Final Office Action for U.S. Appl. No. 12/784,300, filed May 20, 2010, mailed May 29, 2013, 71 pgs.
Hyland, Gregory E.; Issue Notification for U.S. Appl. No. 12/784,300, filed May 20, 2010, mailed Aug. 13, 2014. 1 pg.
Hyland, Gregory E.; Non-Final Office Action for U.S. Appl. No. 12/784,300, filed May 20, 2010, mailed Sep. 10, 2012, 35 pgs.
Hyland, Gregory E.; Non-Final Office Action for U.S. Appl. No. 12/784,300, filed May 20, 2010, mailed Sep. 24, 2013; 37 pgs.
Hyland, Gregory E.; Notice of Allowance for U.S. Appl. No. 12/784,300, filed May 20, 2010, mailed Apr. 23, 2014, 20 pgs.
Hyland, Gregory E.; Supplemental Notice of Allowability for U.S. Appl. No. 12/784,300, filed May 20, 2010, mailed Aug. 1, 2014, 4 pgs.
Hyland, Gregory E.; Final Office Action for U.S. Appl. No. 14/450,452, filed Aug. 4, 2014, mailed Aug. 23, 2016, 41 pgs.
Hyland, Gregory E.; Non-Final Office Action for U.S. Appl. No. 14/450,452, filed Aug. 4, 2014, mailed Feb. 17, 2016, 98 pgs.

(56) References Cited

OTHER PUBLICATIONS

Hyland, Gregory E.; Non-final Office Action for U.S. Appl. No. 14/450,452, filed Aug. 4, 2014, mailed Feb. 2, 2017, 40 pgs.
Hyland, Gregory E.; Notice of Allowability for U.S. Appl. No. 14/450,452, filed Aug. 4, 2014, mailed Jul. 18, 2017, 6 pgs.
Hyland, Gregory E.; Notice of Allowance for U.S. Appl. No. 14/450,452, filed Aug. 4, 2014, mailed Jun. 15, 2017, 17 pgs.
Hyland, Gregory; Corrected Notice of Allowability for U.S. Appl. No. 14/450,452, filed Aug. 4, 2014, mailed Sep. 26, 2017, 4 pgs.
Hyland, Gregory; Issue Notification for U.S. Appl. No. 14/450,452, filed Aug. 4, 2014, mailed Oct. 4, 2017, 1 pg.
Keyghobad, Seyamak; Issue Notification for U.S. Appl. No. 10/298,300, filed Nov. 18, 2002, mailed Oct. 8, 2008; 1 pg.
Keyghobad, Seyamak; Non-Final Rejection for U.S. Appl. No. 10/298,300, filed Nov. 18, 2002; mailed Oct. 26, 2007; 35 pages.
Keyghobad, Seyamak; Non-Final Rejection for U.S. Appl. No. 10/298,300, filed Nov. 18, 2002; mailed May 18, 2006; 13 pages.
Keyghobad, Seyamak; Non-Final Rejection or U.S. Appl. No. 10/298,300, filed Nov. 18, 2002; mailed Jun. 6, 2007; 32 pages.
Keyghobad, Seyamak; Notice of Allowance for U.S. Appl. No. 10/298,300; filed Nov. 18, 2002; mailed Jul. 14, 2008; 4 pages.
Keyghobad, Seyamak; Requirement for Restriction/ Election for U.S. Appl. No. 10/298,300, filed Nov. 18, 2002; mailed Feb. 27, 2006; 17 pages.
Keyghobad, Seyamak; Requirement for Restriction/ Election for U.S. Appl. No. 10/298,300, filed Nov. 18, 2002; mailed Feb. 9, 2006; 11 pages.
Keyghobad, Seyamak; Examiner Interview Summary Record for U.S. Appl. No. 12/243,452, filed Oct. 1, 2008; mailed Dec. 7, 2009; 3 pages.
Keyghobad, Seyamak; Issue Notification for U.S. Appl. No. 12/243,452, filed Oct. 1, 2008 mailed Jun. 16, 2010; 1 pg.
Keyghobad, Seyamak; Non-Final Rejection for U.S. Appl. No. 12/243,452, filed Oct. 1, 2008; mailed Sep. 14, 2009; 12 pages.
Keyghobad, Seyamak; Notice of Allowance for U.S. Appl. No. 12/243,452, filed Oct. 1, 2008; mailed Mar. 22, 2010; 7 pages.
Keyghobad, Seyamak; Non-Final Rejection for U.S. Appl. No. 12/243,452, filed Oct. 1, 2008; mailed May 1, 2009; 5 pages.
Keyghobad, Seyamak; Issue Notification for U.S. Appl. No. 12/490,867, filed Jun. 24, 2009, mailed Feb. 29, 2012; 1 pg.
Keyghobad, Seyamak; Non Final Rejection for U.S. Appl. No. 12/490,867, filed Jun. 24, 2009, mailed Mar. 21, 2011; 9 pgs.
Keyghobad, Seyamak; Non Final Rejection for U.S. Appl. No. 12/490,867, filed Jun. 24, 2009, mailed Oct. 4, 2010; 13 pgs.
Hyland, Gregory E.; Office Action for Canadian patent application No. 2,772,545, filed May 20, 2010, mailed Jun. 22, 2017, 3 pgs.
Hyland, Gregory E.; Mexico Final Office Action for serial No. MX/A/2011/012383, filed May 20, 2010, mailed Jan. 9, 2014, 9 pgs.
Hyland, Gregory E.; Mexico Office Action for serial No. MX/A/2011/012383, filed May 20, 2010, mailed Oct. 8, 2012, 3 pgs.
Hyland, Gregory E.; Mexico Office Action for serial No. MX/A/2011/012383, filed May 20, 2010, mailed May 9, 2013, 8 pgs.
Hyland, Gregory E.; Mexico Office Action for serial No. MX/A/2011/012383, filed May 20, 2010, mailed Sep. 3, 2013, 10 pgs.
Hyland, European Search Report for serial No. EP2433440, filed Nov. 18, 2011, mailed Nov. 28, 2012, 6 pgs.
Hyland, Gregory E.; Australian Patent Examination report for serial No. 2010249499, filed Nov. 17, 2011, mailed Nov. 21, 2014, 5 pgs.
Hyland, Gregory E.; Australian Patent Examination report for serial No. 2010249499, filed Nov. 17, 2011, mailed Jun. 16, 2014, 5 pgs.
Hyland, Gregory; Decision of Rejection for Japanese serial No. 2012-512048, filed May 20, 2010, mailed Apr. 22, 2014, 10 pgs.
Hyland, Gregory; Japanese Office Action for serial No. 2012-512048, filed May 20, 2010, mailed Oct. 22, 2013, 51 pgs.
Hyland, Gregory; Mexico Office Action for serial No. MX/a/2012/015236, filed Dec. 19, 2012, mailed Oct. 3, 2013, 8 pgs.
Hyland, Gregory; Mexico Office Action for serial No. MX/a/2012/015236, filed Dec. 19, 2012, mailed Dec. 3, 2013, received by foreign associate on Jan. 9, 2014, 4 pgs.
Hyland, Gregory; Mexico Office Action for serial No. MX/a/2012/015236, filed Dec. 19, 2012, mailed Jun. 13, 2013, 4 pgs.
Hyland, Gregory E.; Australian Patent Examination report for serial No. 2015202223, filed May 20, 2010, mailed Nov. 4, 2015, 4 pgs.
Hyland, Gregory E.; Extended European Search Report for serial No. 18184468.9, filed May 20, 2010, mailed Dec. 3, 2018, 9 pgs.
Hyland, Gregory E.; Office Action for European patent application No. 18184468.9, filed May 20, 2010, mailed Jun. 22, 2023, 6 pgs.
Hyland, Gregory E.; Extended European Search Report for serial No. 18184481.2, filed May 20, 2010, mailed Dec. 3, 2018, 9 pgs.
Clark, Kenneth A.; Applicant-Initiated Interview Summary for U.S. Appl. No. 14/209,257, filed Mar. 13, 2014, mailed Jul. 19, 2017, 7 pgs.
Clark, Kenneth A.; Final Office Action for U.S. Appl. No. 14/209,257, filed Mar. 13, 2014, mailed Jun. 28, 2017, 41 pgs.
Clark, Kenneth A.; Issue Notification for U.S. Appl. No. 14/209,257, filed Mar. 13, 2014, mailed Dec. 22, 2018, 1 pg.
Clark, Kenneth A.; Issue Notification for U.S. Appl. No. 14/209,257, filed Mar. 13, 2014, mailed Sep. 26, 2018, 11 pg.
Clark, Kenneth A.; Non-Final Office Action for U.S. Appl. No. 14/209,257, filed Mar. 13, 2014, mailed Oct. 16, 2017, 33 pgs.
Clark, Kenneth A.; Non-final Office Action for U.S. Appl. No. 14/209,257, filed Mar. 13, 2014, mailed Feb. 22, 2017, 95 pgs.
Clark, Kenneth A.; Notice of Allowance for U.S. Appl. No. 14/209,257, filed Mar. 13, 2014, mailed Jun. 27, 2018, 26 pgs.
Clark, Kenneth A.; Restriction Requirement for U.S. Appl. No. 14/209,257, filed Mar. 13, 2014, mailed Oct. 4, 2016, 7 pgs.
Clark, Kenneth A.; Final Office Action for U.S. Appl. No. 16/118,914, filed Aug. 31, 2018, mailed Mar. 23, 2020, 52 pgs.
Clark, Kenneth A.; Final Office Action for U.S. Appl. No. 16/118,914, filed Aug. 31, 2018, mailed Sep. 3, 2021, 22 pgs.
Clark, Kenneth A.; Non-Final Office Action for U.S. Appl. No. 16/118,914, filed Aug. 31, 2018, mailed Mar. 4, 2021, 55 pgs.
Clark, Kenneth A.; Non-Final Office Action for U.S. Appl. No. 16/118,914, filed Aug. 31, 2018, mailed Sep. 9, 2019, 107 pgs.
Clark, Kenneth A.; Notice of Allowance for U.S. Appl. No. 16/118,914, filed Aug. 31, 2018, mailed Nov. 9, 2021, 10 pgs.
Whittle, et al.; Article entitled: "WaterWise@SG: A Testbed for Continuous Monitoring of the Water Distribution System in Singapore", Water Distribution Analysis 2010—WDSA2010, Tucson, AZ, USA, Sep. 12-15, 2010; 16 pgs.
Clark, Kenneth A.; Final Office action for U.S. Appl. No. 16/118,907, filed Aug. 31, 2018, mailed Apr. 16, 2020, 35 pgs.
Clark, Kenneth A.; Non-Final Office Action for U.S. Appl. No. 16/118,907, filed Aug. 31, 2018, mailed Oct. 11, 2019, 104 pgs.
Clark, Kenneth A.; Certificate of Correction for U.S. Appl. No. 15/347,849, filed Nov. 10, 2016, mailed Oct. 18, 2022, 1 pg.
Clark, Kenneth A.; Final Office Action for U.S. Appl. No. 15/347,849, filed Nov. 10, 2016, mailed Jun. 1, 2018, 29 pgs.
Clark, Kenneth A.; Issue Notification for U.S. Appl. No. 15/347,849, filed Nov. 10, 2016, mailed Jan. 23, 2019, 1 pg.
Clark, Kenneth A.; Non-Final Office Action for U.S. Appl. No. 15/347,849, filed Nov. 10, 2016, mailed Nov. 3, 2017, 84 pgs.
Clark, Kenneth A.; Notice of Allowance for U.S. Appl. No. 15/347,849, filed Nov. 10, 2016, mailed Sep. 18, 2018, 20 pgs.
Clark, Kenneth A.; Applicant-Initiated Interview Summary for U.S. Appl. No. 16/118,664, filed Aug. 31, 2018, mailed Dec. 26, 2019, 6 pgs.
Clark, Kenneth A.; Applicant-Initiated Interview Summary for U.S. Appl. No. 16/118,664, filed Aug. 31, 2018, mailed Jun. 11, 2021, 3 pgs.
Clark, Kenneth A.; Corrected Notice of Allowance for U.S. Appl. No. 16/118,664, filed Aug. 31, 2018, mailed Nov. 4, 2021, 19 pgs.
Clark, Kenneth A.; Final Office Action for U.S. Appl. No. 16/118,664, filed Aug. 31, 2018, mailed Apr. 7, 2020, 23 pgs.
Clark, Kenneth A.; Non-Final Office Action for U.S. Appl. No. 16/118,664, filed Aug. 31, 2018, mailed Oct. 1, 2019, 95 pgs.
Clark, Kenneth A.; Notice of Allowance for U.S. Appl. No. 16/118,664, filed Aug. 31, 2018, mailed Oct. 21, 2021, 21 pgs.
Clark, Kenneth A.; Requirement for Restriction/Election for U.S. Appl. No. 16/118,664, filed Aug. 31, 2018, mailed Apr. 27, 2021, 29 pgs.

(56) References Cited

OTHER PUBLICATIONS

McCraven, Jeremy; Non-Final Office Action for U.S. Appl. No. 14/273,823, filed May 9, 2014, mailed Apr. 12, 2016, 86 pgs.
McCraven, Jeremy; Notice of Allowance for U.S. Appl. No. 14/273,823, filed May 9, 2014, mailed Jul. 7, 2016, 10 pgs.
McCraven, Jeremy; Supplemental Notice of Allowability for U.S. Appl. No. 14/273,823, filed May 9, 2014, mailed Aug. 9, 2016, 6 pgs.
Gifford, Paul; Corrected Notice of Allowance for U.S. Appl. No. 15/171,722, filed Jun. 2, 2016, mailed Apr. 16, 2021, 5 pgs.
Gifford, Paul; Corrected Notice of Allowance for U.S. Appl. No. 15/171,722, filed Jun. 2, 2016, mailed May 14, 2021, 7 pgs.
Keyghobad, Seyamak; Notice of Allowance for U.S. Appl. No. 12/490,867, filed Jun. 24, 2006, mailed Sep. 7, 2011; 6 pgs.
Keyghobad, Seyamak; Notice of Allowance for U.S. Appl. No. 12/490,867, filed Jun. 24, 2009, mailed Nov. 2, 2011; 17 pgs.
Keyghobad, Seyamak; Issue Notification for U.S. Appl. No. 12/490,925, filed Jun. 24, 2009; mailed Mar. 18, 2010; 1 pg.
Keyghobad, Seyamak; Non-final office action for U.S. Appl. No. 12/490,925, filed Jun. 24, 2009; mailed Dec. 23, 2009; 17 pgs.
Keyghobad, Seyamak; Notice of Allowance for U.S. Appl. No. 12/490,925, filed Jun. 24, 2009, mailed Aug. 2, 2010, 8 pgs.
Keyghobad, Seyamak; Notice of Allowance for U.S. Appl. No. 12/490,925, filed Jun. 24, 2009; mailed Jul. 19, 2010; 8 pages.
Keyghobad, Seyamak; Issue Notification for U.S. Appl. No. 12/490,957, filed Jun. 24, 2009; mailed Aug. 4, 2010; 1 pg.
Keyghobad, Seyamak; Notice of Allowance for U.S. Appl. No. 12/490,957, filed Jun. 24, 2009; mailed Jun. 24, 2010; 10 pgs.
Keyghobad, Seyamak; Non-Final Rejection for U.S. Appl. No. 12/490,957, filed Jun. 24, 2009; mailed Dec. 23, 2009; 17 pgs.
Keyghobad, Seyamak; Issue Notification for U.S. Appl. No. 13/372,408, filed Feb. 13, 2012, mailed Mar. 6, 2013, 1 pg.
Keyghobad, Seyamak; Non-final Office Action for U.S. Appl. No. 13/372,408, filed Feb. 23, 2012; mailed Jun. 25, 2012; 17 pgs.
Keyghobad, Seyamak; Notice of Allowance for U.S. Appl. No. 13/372,408, filed Feb. 13, 2012, mailed Jul. 27, 2012; 11 pgs.
Keyghobad, Seyamak; Notice of Allowance for U.S. Appl. No. 13/372,408, filed Feb. 13, 2012; mailed Nov. 1, 2012; 18 pgs.
Keyghobad, Seyamak; Supplemental Notice of Allowance for U.S. Appl. No. 13/372,408, filed Feb. 13, 2012; mailed Aug. 2, 2012; 7 pgs.
Keyghobad, Seyamak, Issue Notification for U.S. Appl. No. 13/590,954, filed Aug. 21, 2012, mailed Sep. 11, 2013, 1 pg.
Keyghobad, Seyamak; Non-Final Office Action for U.S. Appl. No. 13/590,954, filed Aug. 21, 2012, mailed Dec. 13, 2012; 39 pgs.
Keyghobad, Seyamak; Notice of Allowance for U.S. Appl. No. 13/590,954, filed Aug. 21, 2012, mailed Mar. 21, 2013, 22 pgs.
Keyghobad, Seyamak; Notice of Allowance for U.S. Appl. No. 13/590,954, filed Aug. 21, 2012, mailed Jul. 9, 2013, 21 pgs.
Hyland; International Preliminary Report on Patentability for serial No. PCT/US2009/062247, filed Oct. 27, 2009, mailed May 3, 2011, 7 pgs.
Hyland; International Search Report for serial No. PCT/US2009/062247, filed on Oct. 27, 2009, mailed Dec. 18, 2009, 2 pgs.
Hyland, Gregory E.; Canadian Office Action for serial No. 2,741,843, filed Oct. 27, 2009, mailed Dec. 8, 2015, 5 pgs.
Hyland, Gregory E.; Canadian Office Action for Serial No. 2,741,843, filed Oct. 27, 2009, mailed Apr. 25, 2017, 7 pgs.
Hyland, Gregory E.; Canadian Office Action for serial No. 2,741,843, filed Oct. 27, 2009, mailed Jul. 22, 2016, 5 pgs.
Hyland, Gregory; Mexico Office Action for serial No. MX/a/2011/004330, filed Apr. 25, 2011, mailed Oct. 3, 2013, 6 pgs.
Hyland, Gregory; Mexico Office Action for serial No. MX/a/2011/004330, filed Apr. 25, 2011, mailed Jul. 18, 2013, 6 pgs.
Hyland, Gregory; Mexico Office Action for serial No. MX/a/2011/004330, filed Apr. 25, 2011, mailed Mar. 21, 2013, 7 pgs.
Hyland; European Examination Report for serial No. EP09824079.9, filed Oct. 27, 2009, mailed Nov. 13, 2015; 6 pgs.
Hyland; European Search Report for serial No. EP09824079.9, filed Oct. 27, 2009, mailed May 8, 2012; 38 pages.
Hyland, Gregory; Australian Patent Examination Report for serial No. 2009308949, filed Oct. 27, 2009, mailed Nov. 12, 2013, 3 pgs.
Hyland, Gregory E.; Decision of Rejection for Japanese serial No. 2011-533427, filed Oct. 27, 2009, mailed Sep. 16, 2014, 4 pgs.
Hyland, Gregory E.; Japanese Office Action for serial No. 2011-533427, filed Oct. 27, 2009, mailed Feb. 4, 2014, 50 pgs.
Hyland, Gregory E.; Japanese Office Action for serial No. 2011-533427, filed Oct. 27, 2009, mailed Apr. 30, 2013, 15 pgs.
Hyland, Gregory E.; Australian Examination Report for serial No. 2014259545, filed Oct. 27, 2009, mailed Jun. 10, 2015; 2 pgs.
Environmental Protection Agengy; Article entitled: "Technologies and Techniques for Early Warning Systems to Monitor and Evaluate Drinking Water Quality: A Stage of the Art Review", located at AU2014259545.
Honeywell; Article entitled: "Corrosion Solutions for Multiphase Oil & Gas Production", located at <http://cindtechs.ca/unleashd/catalog/analytical/Honeywell-CET5000/pi_sn_Multiphase_09.pdf>, Aug. 2006, 2 pgs.
Hyland, Gregory E.; Office Action for Canadian patent application No. 2,997,878, filed Oct. 27, 2009, mailed Oct. 29, 2021, 10 pgs.
Hyland, Gregory E.; Office Action for Canadian patent application No. 2,997,878, filed Oct. 27, 2009, mailed Nov. 25, 2020, 7 pgs.
Hyland, Gregory E.; Office Action for Canadian patent application No. 2,997,878, filed Oct. 27, 2009, mailed Dec. 10, 2018, 4 pgs.
Hyland, Gregory E.; Office Action for Canadian patent application No. 2,997,878, filed Oct. 27, 2009, mailed Apr. 2, 2020, 7 pgs.
Hyland, Gregory E.; Office Action for Canadian patent application No. 2,997,878, filed Oct. 27, 2009, mailed May 25, 2021, 13 pgs.
Hyland, Gregory E.; Office Action for Canadian patent application No. 2,997,878, filed Oct. 27, 2009, mailed Jul. 15, 2022, 16 pgs.
Hyland, Gregory E.; Office Action for Canadian patent application No. 2,997,878, filed Oct. 27, 2009, mailed Jul. 16, 2020, 7 pgs.
Hyland, Gregory E.; Office Action for Canadian patent application No. 2,997,878, filed Oct. 27, 2009, mailed Sep. 27, 2019, 5 pgs.
Icelandic Building Research Institute, et al.; "Monitoring corrosion in district heating systems", Nordic Innovation, Project No. 00071, Final Report, pp. 1-254, May 2004 (May 2004).
Perkins; Article entitled: "New Developments in Microcor Technology", located at <https://www.cosasco.com/resources/technical-library/technical-papers>, las modified Nov. 27, 2007, 17 pgs.
Hyland, Gregory E.; Extended European Search Report for serial No. 18214263.8, filed Oct. 27, 2009, mailed Sep. 2, 2019, 11 pgs.
Hyland, Gregory E.; Office Action for European application No. 18214263.8, filed Oct. 27, 2009, mailed Mar. 1, 2021, 7 pgs.
Hyland; International Search Report and Written Opinion for serial No. PCT/US2010/035666, filed May 20, 2010, mailed Jul. 16, 2010, 7 pgs.
Hyland; International Preliminary Report on Patentability for serial No. PCT/US2010/035666, filed May 20, 2010, mailed Nov. 22, 2011, 6 pgs.
Hyland, Gregory E.; Office Action for Canadian application No. 2,772,545, filed May 10, 2010, mailed Jul. 27, 2016, 4 pgs.
Clark, Kenneth A.; Notice of Allowance for U.S. Appl. No. 17/572,722, filed Jan. 11, 2022, mailed Nov. 8, 2024, 127 pgs.
Clark, Kenneth A.; Requirement for Restriction/Election for U.S. Appl. No. 17/572,722, filed Jan. 11, 2022, mailed May 29, 2024, 8 pgs.
Joyce, D.; Rule 71(3) Communication—Intention to Grant for European Patent Application No. 23155054.2, filed Mar. 13, 2014, mailed Feb. 10, 2025, 62 pgs.
Gifford, P.; Official Action for European Patent Application No. 16804634.0, filed Jun. 6, 2016, mailed Apr. 3, 2025, 6 pgs.
Bowman, Clay Evan; Non-Final Office Action for U.S. Appl. No. 18/975,274, filed Dec. 10, 2024, mailed Feb. 19, 2025, 22 pgs.
Bowman, Clay Evan; Notice of Allowance for U.S. Appl. No. 18/975,274, filed Dec. 10, 2024, mailed Jun. 17, 2025, 18 pgs.

* cited by examiner

FLUID FLUSHING SYSTEM

CROSS-REFERENCE TO RELATED APPLICATIONS

The present application is a continuation of U.S. application Ser. No. 16/930,962, filed Jul. 16, 2020, which is hereby specifically incorporated by reference herein in its entirety.

TECHNICAL FIELD

This disclosure relates to flushing systems. More specifically, this disclosure relates to a remotely-operable flushing system for fluid distribution systems.

BACKGROUND

Flushing systems can be used to periodically flush fluid from fluid systems, such as water systems. Flushing water systems can be done for a variety of reasons, including improving the quality of the water. Flushing systems are typically contained within a housing comprising a removable lid. To operate the flushing system, an operator must typically remove the lid from the housing and manually activate the flushing system. An operator must also typically be physically present to obtain various information related to fluid within the flushing system or the flushing system itself.

SUMMARY

It is to be understood that this summary is not an extensive overview of the disclosure. This summary is exemplary and not restrictive, and it is intended neither to identify key or critical elements of the disclosure nor delineate the scope thereof. The sole purpose of this summary is to explain and exemplify certain concepts of the disclosure as an introduction to the following complete and extensive detailed description.

Disclosed is a remote-operated flushing system comprising a fluid routing assembly comprising a valve, the valve configurable in an open configuration, wherein fluid is permitted to flow through the fluid routing assembly, and a closed configuration, wherein the fluid is prohibited from flowing through the fluid routing assembly; a control device configured to actuate the valve between the open configuration and closed configuration; a remote operation device wirelessly connected to the control device and configured to remotely operate the control device to control the actuation of the valve between the open configuration and closed configuration; and a sensor configured to detect a fluid property of the fluid within the fluid routing assembly, wherein the control device is configured to wirelessly send a signal representative of the fluid property detected by the sensor.

Also disclosed is a remote-operated flushing system comprising a fluid routing assembly comprising a valve, the valve configurable in an open configuration, wherein fluid is permitted to flow through the fluid routing assembly, and a closed configuration, wherein the fluid is prohibited from flowing through the fluid routing assembly; and a pressure monitoring system, the pressure monitoring system comprising: a pressure sensor mounted to the fluid routing assembly and configured to detect a pressure of the fluid within the fluid routing assembly; and a pressure monitoring unit configured to wirelessly send a pressure signal representative of the pressure detected by the pressure sensor, the pressure monitoring unit further configured to wirelessly receive a control signal from a remote operation device and to actuate the valve between the open configuration and closed configuration in response to the control signal.

Also disclosed is a method of operating a flushing system, the method comprising providing a flushing system comprising a fluid routing assembly and a control device, the fluid routing assembly comprising a valve configurable in an open configuration, wherein fluid is permitted to flow through the fluid routing assembly, and a closed configuration, wherein the fluid is prohibited from flowing through the fluid routing assembly; remotely sending a control signal to a control device; actuating the valve between the open configuration and closed configuration with the control device in response to the control signal; detecting a pressure of the fluid with a pressure sensor; and sending a signal with the control device, the signal representative of the pressure detected by the pressure sensor.

Additionally, disclosed is a fluid flushing system comprising a sampling port comprising a sampling conduit configured to dispense a sample of a fluid in the fluid routing assembly; a valve configurable in an open valve configuration, wherein the fluid is permitted to flow through the fluid flushing system, and a closed valve configuration, wherein the fluid is prohibited from flowing through the fluid flushing system; and a backflow preventer disposed between the sampling port and the valve, the backflow preventer configured to allow the fluid to flow in a first direction through the fluid flushing system towards the valve and to prevent the fluid from flowing in an opposite second direction through the fluid flushing system towards the sampling port.

A method of operating a fluid flushing system is also disclosed, the method comprising providing the fluid flushing system comprising an inlet conduit, an outlet conduit, a backflow preventer disposed between the inlet conduit and the outlet conduit, and a flow valve disposed between the backflow preventer and the outlet conduit, wherein the backflow preventer is configured to allow a fluid to flow in a first direction through the fluid flushing system towards the flow valve and to prevent the fluid from flowing in an opposite second direction through the fluid flushing system towards the inlet conduit; actuating a shutoff valve of the backflow preventer to an open configuration to allow the fluid to flow through the backflow preventer from the inlet conduit to the flow valve; and actuating the shutoff valve to a closed configuration to prohibit fluid from flowing through the backflow preventer.

Various implementations described in the present disclosure may include additional systems, methods, features, and advantages, which may not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims.

BRIEF DESCRIPTION OF THE DRAWINGS

The features and components of the following figures are illustrated to emphasize the general principles of the present disclosure. Corresponding features and components throughout the figures may be designated by matching reference characters for the sake of consistency and clarity.

DETAILED DESCRIPTION

Figure 1A:
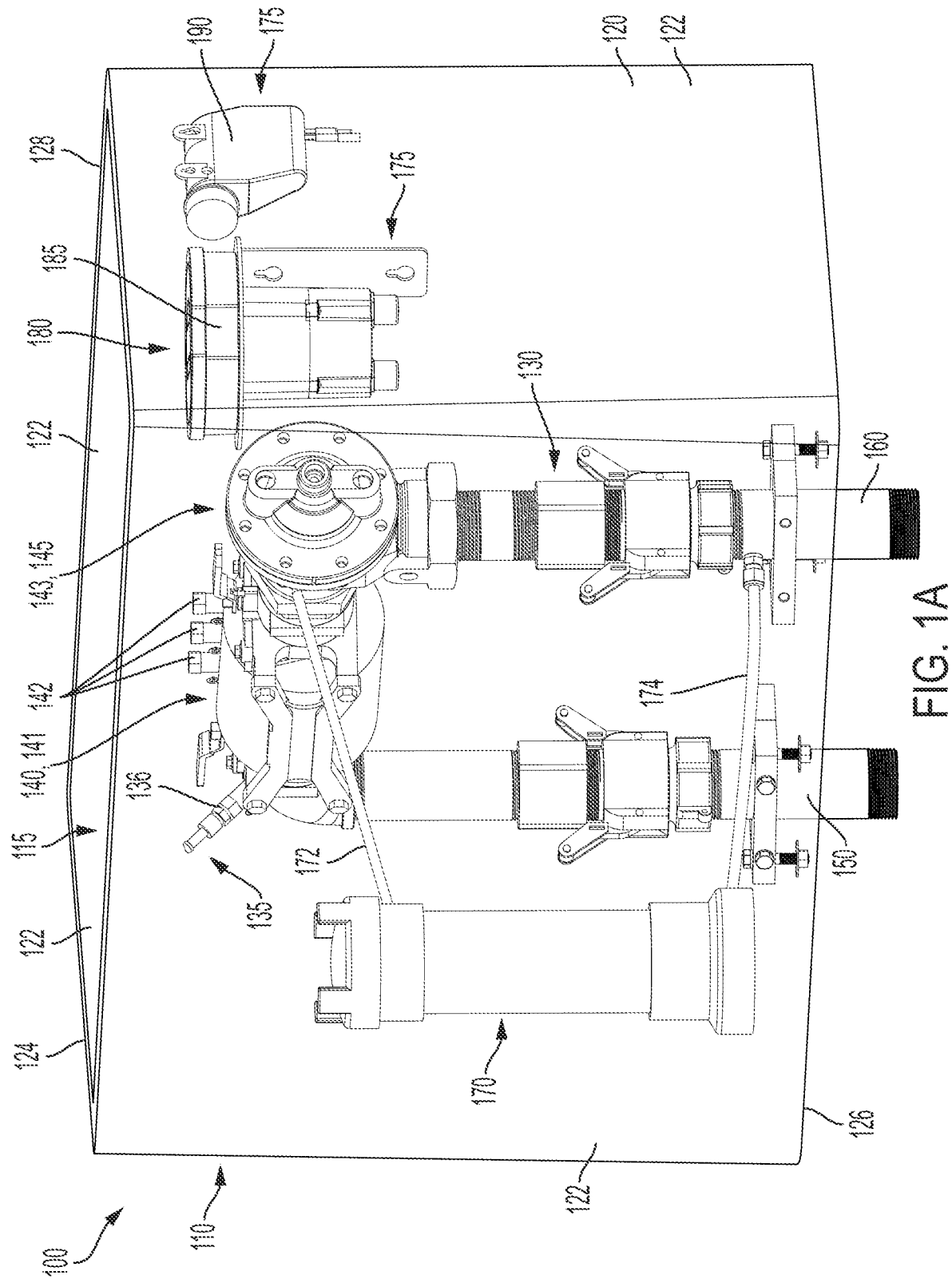
FIG. 1A is a perspective view of a flushing system, in accordance with one aspect of the present disclosure.

The present disclosure can be understood more readily by reference to the following detailed description, examples, drawings, and claims, and the previous and following description. However, before the present devices, systems, and/or methods are disclosed and described, it is to be understood that this disclosure is not limited to the specific devices, systems, and/or methods disclosed unless otherwise specified, and, as such, can, of course, vary. It is also to be understood that the terminology used herein is for the purpose of describing particular aspects only and is not intended to be limiting.

The following description is provided as an enabling teaching of the present devices, systems, and/or methods in its best, currently known aspect. To this end, those skilled in the relevant art will recognize and appreciate that many changes can be made to the various aspects of the present devices, systems, and/or methods described herein, while still obtaining the beneficial results of the present disclosure. It will also be apparent that some of the desired benefits of the present disclosure can be obtained by selecting some of the features of the present disclosure without utilizing other features. Accordingly, those who work in the art will recognize that many modifications and adaptations to the present disclosure are possible and can even be desirable in certain circumstances and are a part of the present disclosure. Thus, the following description is provided as illustrative of the principles of the present disclosure and not in limitation thereof.

As used throughout, the singular forms "a," "an" and "the" include plural referents unless the context clearly dictates otherwise. Thus, for example, reference to "an element" can include two or more such elements unless the context indicates otherwise.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

For purposes of the current disclosure, a material property or dimension measuring about X or substantially X on a particular measurement scale measures within a range between X plus an industry-standard upper tolerance for the specified measurement and X minus an industry-standard lower tolerance for the specified measurement. Because tolerances can vary between different materials, processes and between different models, the tolerance for a particular measurement of a particular component can fall within a range of tolerances.

As used herein, the terms "optional" or "optionally" mean that the subsequently described event or circumstance can or cannot occur, and that the description includes instances where said event or circumstance occurs and instances where it does not.

The word "or" as used herein means any one member of a particular list and also includes any combination of members of that list. Further, one should note that conditional language, such as, among others, "can," "could," "might," or "may," unless specifically stated otherwise, or otherwise understood within the context as used, is generally intended to convey that certain aspects include, while other aspects do not include, certain features, elements and/or steps. Thus, such conditional language is not generally intended to imply that features, elements and/or steps are in any way required for one or more particular aspects or that one or more particular aspects necessarily include logic for deciding, with or without user input or prompting, whether these features, elements and/or steps are included or are to be performed in any particular aspect.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutations of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific aspect or combination of aspects of the disclosed methods.

Disclosed is a remote-operated flushing system and associated methods, systems, devices, and various apparatus. Example aspects of the remote-operated flushing system can comprise a valve configured to control fluid flow through the flushing system and a control device to allow remote operation of the valve. It would be understood by one of skill in the art that the flushing system is described in but a few exemplary embodiments among many. No particular terminology or description should be considered limiting on the disclosure or the scope of any claims issuing therefrom.

Figure 4:
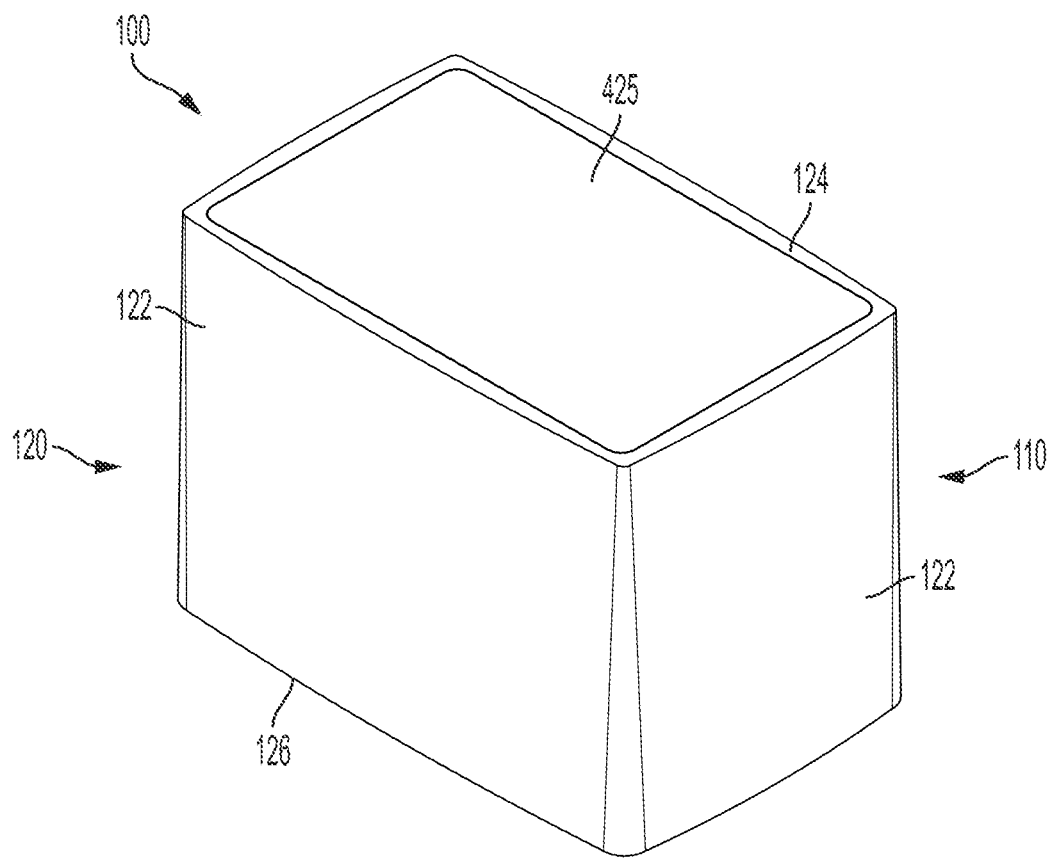
FIG. 4 is a top perspective view of a housing of the flushing system of FIG. 1A.

FIG. 1A is a perspective view of a flushing system 100, in accordance with one aspect of the present disclosure. The flushing system 100 can be configured to flush fluid, such as water, from a fluid system, such as, for example, a municipal water system, or any other fluid system where it may be desirable to periodically flush fluid out of the fluid system. For example, it may be desirable to flush stagnant or contaminated water out of the fluid system. As shown, example aspects of the flushing system 100 can comprise a housing 110 defining an interior cavity 115 within which various components of the flushing system 100 can be contained. In the present FIG. 1A, the housing 110 is illustrated as transparent for visibility of the components within the interior cavity 115. According to example aspects, the housing 110 can comprise a sidewall enclosure 120 comprising a plurality of sidewalls 122 and defining an upper end 124 and a lower end 126, relative to the orientation shown. In some aspects, an access opening 128 providing access to the interior cavity 115 can be formed at the upper end 124. The housing 110 can further comprise a lid 425 (shown in FIG. 4) oriented at the upper end 124 of the sidewall enclosure 120 and a base 129 (shown in FIG. 1B) oriented at the lower end 126 of the sidewall enclosure 120. As described in further detail below, in some aspects, the lid 425 can be configured to selectively uncover the access opening 128, as shown, and cover the access opening 128, as shown in FIG. 4. In example aspects, the housing 110 can be buried below or mostly below ground, and that the lid 425 can be oriented about flush with ground level. As such, the lid 425 can be removed from the sidewall enclosure 120 as needed, without the flushing system 100 extending above ground. Example aspects of the housing 110 can be formed from a composite material, a plastic material, such as polyvinyl chloride (PVC), a metal material, or any other suitable material or combination of materials known in the art.

According to example aspects, the flushing system 100 can comprise a substantially U-shaped fluid routing assembly 130 configured to route fluid from the fluid system through the flushing system 100. In other aspects, the fluid routing assembly 130 may not define a U-shape. Example aspects of the fluid routing assembly 130 can comprise a sampling port 135, a backflow preventer 140, and a valve 143. In example aspects, the valve 143 can be an adjustable flow valve 145, as shown, and can be configured to control the flow of fluid through the flushing system 100. In other aspects, the valve 143 can be any other suitable type of valve known in the art. Additionally, in example aspects, some or all of the internal components of the adjustable flow valve 145 can comprise a stainless steel material; however, in other aspects, the internal components of the adjustable flow valve 145 can comprise any other suitable material or combination of materials. An inlet pathway 150 can be provided for routing fluid into the fluid routing assembly 130 and an outlet pathway 160 can be provided for routing the fluid out of the fluid routing assembly 130. In the present aspect, fluid from the fluid system can flow into the flushing system 100 through the inlet pathway 150, past the sampling port 135, through the backflow preventer 140, through the adjustable flow valve 145, and out of the flushing system 100 through the outlet pathway 160. In some aspects, the fluid can further be configured to flow through a dechlorination unit 170.

As shown, the sampling port 135 can be oriented between the inlet pathway 150 and the backflow preventer 140. According to example aspects, the sampling port 135 can comprise a sampling conduit 136 configured to dispense samples of the fluid in the fluid routing assembly 130 for testing the quality of the fluid. For example, the fluid can be tested for levels of lead, bacteria, nitrates, chlorine, pH levels, or the like. The fluid can be dispensed into a collection container and can be tested on site or taken to a testing facility. In some aspects, samples of the fluid can be obtained from the flushing system 100 even when the flushing system 100 is not actively flushing. In example aspects, the backflow preventer 140 can be oriented between the sampling port 135 and the adjustable flow valve 145. The backflow preventer 140 can be configured to allow fluid to flow therethrough in a first direction towards the outlet pathway 160, but can prevent the fluid from flowing in an opposite second direction back towards the inlet pathway 150. As such, the fluid in the fluid system can be protected from contamination by the fluid in the flushing system 100 backflowing into the fluid system. In the present aspect, the backflow preventer 140 can be a double check valve 141, though in other aspects, the backflow preventer 140 can define any other suitable configuration known in the art, such as an air gap. Example aspects of the backflow preventer 140 can comprise one or more relief valves 142, as shown. The relief valves 142 may be spaced apart along the backflow preventer 140 to relive air buildup within the backflow preventer 140 at various points.

According to example aspects, the adjustable flow valve 145 can be oriented between the backflow preventer 140 and the outlet pathway 160. The adjustable flow valve 145 can be configured to control the operation of the flushing system 100. For example, the adjustable flow valve 145 can be selectively oriented in an open configuration and a closed configuration. In the open configuration, fluid can flow through the adjustable flow valve 145, and the flushing system 100 can flush the fluid through the fluid routing assembly 130. In the closed configuration, the fluid can be prevented from flowing through the adjustable flow valve 145, and the flushing system 100 can thus be prevented flushing the fluid through the fluid routing assembly 130. Example aspects of the adjustable flow valve 145 can be a solenoid-operated adjustable flow valve 145, though in other aspects, the adjustable flow valve 145 can be a hydraulic adjustable flow valve, pneumatic adjustable flow valve, or any other suitable type of adjustable flow valve. In still other aspects, the valve 143 may not be an adjustable flow valve 145, and can instead comprise any other suitable type of valve known in the art. In aspects of the adjustable flow valve 145 that are solenoid-operated, a solenoid 146 (shown in FIG. 1B) can be configured to selectively either admit or release pressure into a main chamber of the adjustable flow valve 145, thus orienting the adjustable flow valve 145 in the closed and open configurations, respectively, in order to prevent or permit fluid flow through the adjustable flow valve 145, respectively. In some aspects, the adjustable flow valve 145 can further be oriented in any suitable number of partially-open configurations to selectively regulate the fluid flow through the adjustable flow valve 145. Example aspects of the adjustable flow valve 145 can further comprise a strainer therein configured to filter debris out the fluid flowing therethrough.

Figure 6:
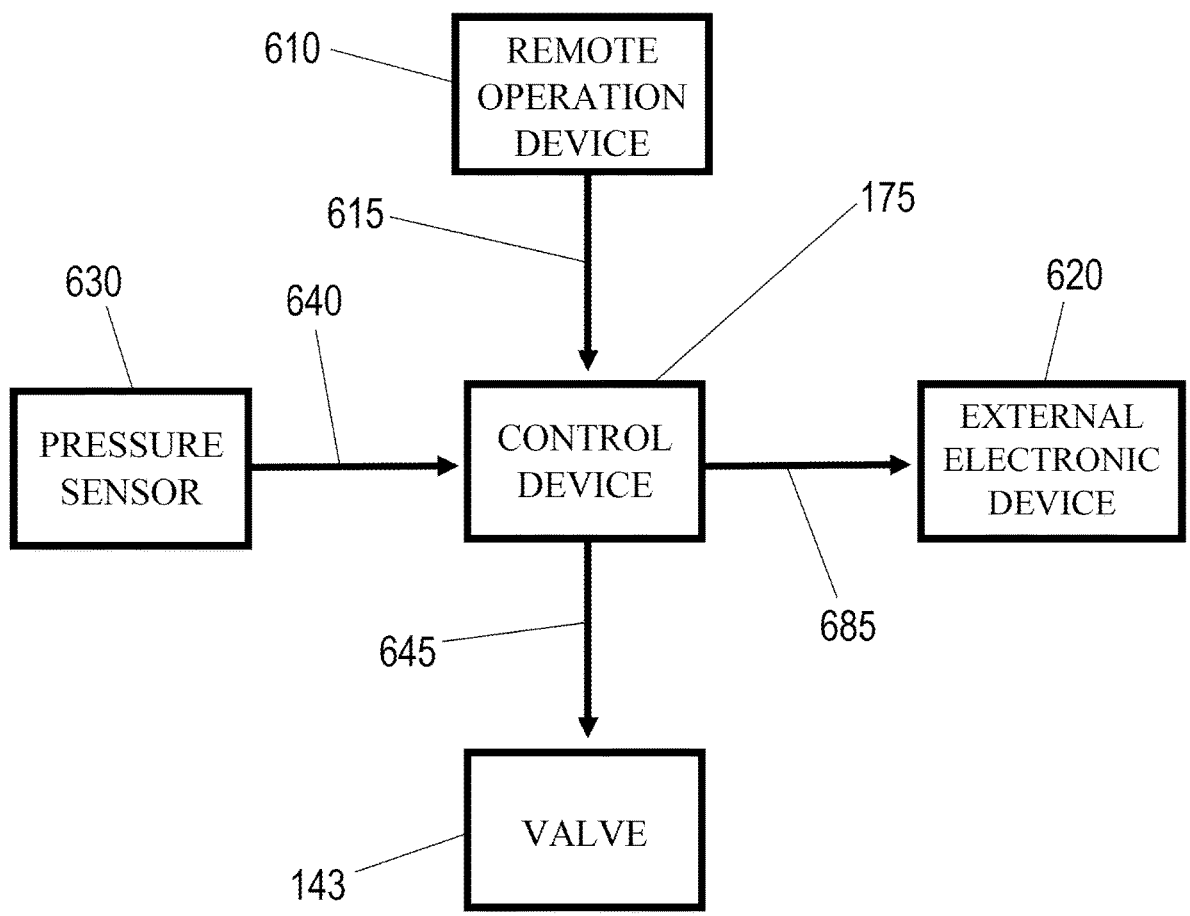
FIG. 6 is a system diagram illustrating a method of operating the flushing system of FIG. 1A.

Example aspects of the flushing system 100 can further comprise a control device 175 configured to allow an operator to remotely control the operation of the flushing system 100, i.e., to remotely control the selective orientation of the adjustable flow valve 145 in the open, closed, and partially-opened configurations, from a remote operation device 610 (shown in FIG. 6). In some aspects, such as the present aspect, the control device 175 can be completely wireless, while in other aspects, the control device 175 can be wired to the adjustable flow valve 145. For example, as shown, the flushing system 100 can comprise one or both of a pressure monitoring system 180 and a Bluetooth® controller 190, and one or both of the pressure monitoring system 180 and Bluetooth® controller 190 can serve as the control device 175. In some aspects, the control device 175 can also be configured to control the speed at which the adjustable flow valve 145 opens and closes, which can aid in preventing water hammer. Bluetooth® is one example of short distance wireless communication protocols, and can be used to implement personal-area networks (PANs) In aspects wherein the Bluetooth® controller 190 is the control device 175 and the adjustable flow valve 145 is solenoid-operated, the Bluetooth® controller 190 can be connected to the solenoid by one or more wires 147 (shown in FIG. 1B). In other aspects, the Bluetooth® controller 190 configured to wirelessly actuate the solenoid 146. Example aspects of the Bluetooth® controller 190 can also be wirelessly connected to the remote operation device 610, which can allow an operator to remotely send signals to the Bluetooth® controller 190 from the remote operation device 610. In other aspects, any other suitable wireless communication technique(s) may be implemented for remotely controlling the adjustable flow valve 145 with the control device 175.

The remote operation device 610 can be, for example, a mobile phone, tablet, computer, or the like. In example aspects, a program or app can be downloaded onto the remote operation device 610, through which the operator can send signals to the Bluetooth® controller 190. For example, the remote operation device 610 can be configured to send a control signal(s) 615 (shown in FIG. 6) to the Bluetooth® controller 190, and the Bluetooth® controller 190 can actuate the adjustable flow valve 145 in response to the control signal(s) 615. As such, an operator can remotely actuate the adjustable flow valve 145 with the remote operation device 610 in order to remotely operate the flushing system 100. Thus, the adjustable flow valve 145 of the flushing system 100 does not need to be physically accessed by an operator in order to be operated. Furthermore, the operator may be able to operate the flushing system 100 at a distance from Bluetooth® controller 190. For example, an operator may be able to operate the flushing system 100 from across the street from the flushing system 100. This can be beneficial in various instances, such as, for example, when the weather is poor and the operator wishes to stay inside their vehicle, or if the flushing system 100 is located in an area that is difficult to access. As shown in the present aspect, the Bluetooth® controller 190 can be mounted to the sidewall enclosure 120 of the housing 110, though in other aspects, the Bluetooth® controller 190 can be mounted at any suitable location within the interior cavity 115, including mounted to the fluid routing assembly 130, the lid 425, or the base 129. Some aspects of the Bluetooth® controller 190 may be configured to control various other features of the flushing system 100 and/or may be configured to communicate information, such as water quality information, to one or more external electronic device(s) 620 (shown in FIG. 6). In a particular example aspect, the external electronic device(s) 620 can be or include a computer at a remote operations center. Furthermore, in some aspects, the external electronic device(s) 620 can be or can include the remote operation device 610.

According to some example aspects, the flushing system 100 can also or alternatively comprise the pressure monitoring system 180. In some aspects, the pressure monitoring system 180 can be similar to the monitoring device disclosed in U.S. patent application Ser. No. 15/171,722, filed Jun. 2, 2016, which is hereby specifically incorporated by reference herein in its entirety. Example aspects of the pressure monitoring system 180 can comprise a pressure sensor 182 (shown in FIG. 1B) and a pressure monitoring unit 185. The pressure sensor 182 can be, for example, a piezo-resistive strain gauge, a capacitive gauge, an electromagnetic gauge, a piezoelectric device, or any other suitable device known in the art for detecting pressure. The pressure sensor 182 can be mounted within the fluid routing assembly 130 such that the pressure sensor 182, or a portion thereof, is in contact with the fluid therein. The pressure sensor 182 can be wired to the pressure monitoring unit 185 by one or more wires 183 (shown in FIG. 1B) and can transmit pressure data obtained by the pressure sensor 182 through the wires 183 to the pressure monitoring unit 185. In other aspects, the pressure sensor 182 may be configured to wirelessly transmit the pressure data to the pressure monitoring unit 185. In various aspects, the pressure sensor 182 can be configured to continually communicate pressure data to the pressure monitoring unit 185, while in other aspects, the pressure sensor 182 can communicate pressure data periodically or only when an anomaly is detected. The pressure monitoring unit 185 can be configured to evaluate the pressure data to determine whether a concern is present. For example, the pressure monitoring unit 185 may comprise a printed circuit board or other processing unit configured to process and evaluate the pressure data. Example aspects of the pressure monitoring unit 185 can also be configured to send a pressure signal 685 (shown in FIG. 6) representative of the detected pressure to a designated electronic device(s) 620, which may include the remote operation device 610, as described in further detail below. In instances wherein the pressure data presents a concern, the pressure monitoring unit 185 may be configured to send an alert signal to the designated electronic device(s) 620. Furthermore, in some aspects, the pressure monitoring unit 185 can be the control device 175 and can be configured to control the operation of the solenoid 146, and thus, the Bluetooth® controller 190 may not be required. As shown, the pressure monitoring unit 185 can be connected to the solenoid 146 by one or more wires 148, or may be wirelessly connected to the solenoid 146. In example aspects, the solenoid 146 can be connected to only one of the Bluetooth® controller 190 and the pressure monitoring unit 185, though in other aspects, the solenoid 146 may be connected to both. Moreover, in some aspects, the pressure monitoring unit 185 may be configured to control various other features of the flushing system 100 and/or may be configured to communicate information, such as water quality information, to the designated external electronic device(s) 620. As shown in the present aspect, the pressure monitoring unit 185 can be mounted to the sidewall enclosure 120 of the housing 110, though in other aspects, the pressure monitoring unit 185 can be mounted at any suitable location within the interior cavity 115, including mounted to the fluid routing assembly 130, the lid 425, or the base 129.

According to example aspects, the flushing system 100 can further comprise the dechlorination unit 170 received within the housing 110. In some aspects, the dechlorination unit 170 can be mounted to the housing 110, for example, to the sidewall enclosure 120, and in other aspects, the dechlorination unit 170 can be mounted to the fluid routing assembly 130. The dechlorination unit 170 can be configured to dechlorinate fluid as it flows therethrough. For example, in some aspects, the dechlorination unit 170 can comprise dechlorination tablets therein which can dechlorinate the fluid as the fluid passes over the dechlorination tablets. The dechlorination tablets can comprise sodium sulfite, ascorbic acid, or any other suitable substance for dechlorinating fluid. According to example aspects, some or all of the fluid being flushed through the flushing system 100 can be routed through the dechlorination unit 170 for dechlorination. As shown, the fluid can be transferred from the fluid routing assembly 130 to the dechlorination unit 170 through a dechlorination inlet conduit 172, and, once dechlorinated, the fluid can be transferred from the dechlorination unit 170 back to the fluid routing assembly 130 through a dechlorination outlet conduit 174. In the present aspect, the dechlorination inlet conduit 172 can extend from the valve 143 to the dechlorination unit 170, and the dechlorination outlet conduit 174 can extend from the dechlorination unit 170 to the outlet pathway 160, downstream of the valve 143. In some aspects, the dechlorination unit 170 may comprise a dechlorination valve that can be selectively adjusted to control the rate of dechlorination. According to example aspects, various local, state, or national standards may exist for the dechlorination of fluid flushed from a fluid system, and the dechlorination unit 170 can be designed to meet or exceed these standards.

Figure 1B:
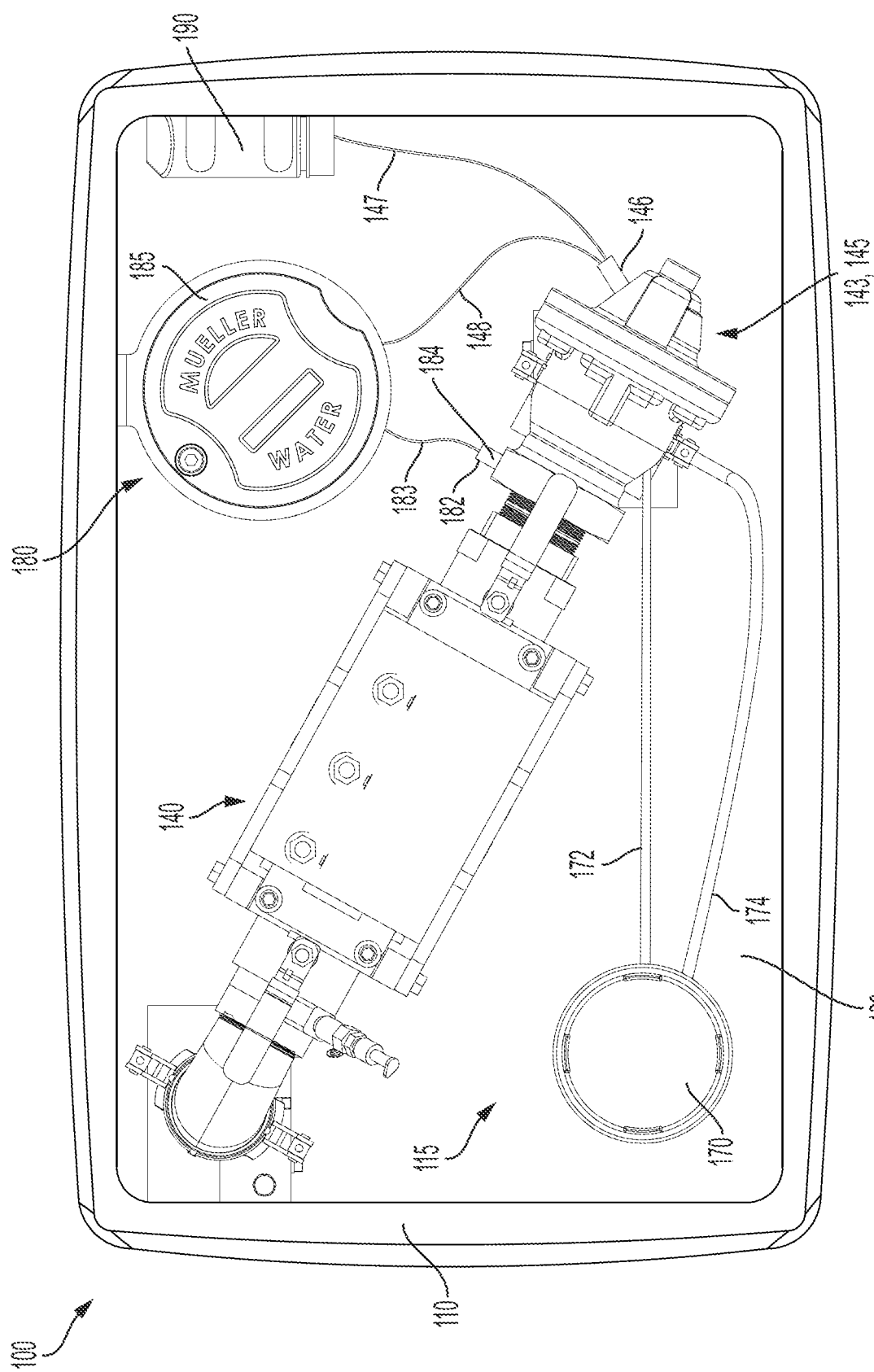
FIG. 1B is a top view of the flushing system of FIG. 1A.

FIG. 1B illustrates a top view of the flushing system 100, wherein the lid 425 (shown in FIG. 4) is removed for visibility into the interior cavity 115. As shown, the pressure sensor 182 can be mounted to the valve 143 at an, and the pressure monitoring unit 185 can be connected to the pressure sensor 182 by the wire 183. The pressure monitoring unit 185 can also be connected to the solenoid 146 by the wire 148. Some aspects of the flushing system 100 can also or alternatively include the Bluetooth® controller 190, which can be connected to the solenoid 146 by the wires 147. In other aspects, the pressure monitoring unit 185 may be wirelessly connected to either or both of the pressure sensor 182 and the solenoid 146 and/or the Bluetooth® controller 190 may be wirelessly connected to the solenoid 146.

Figure 2:
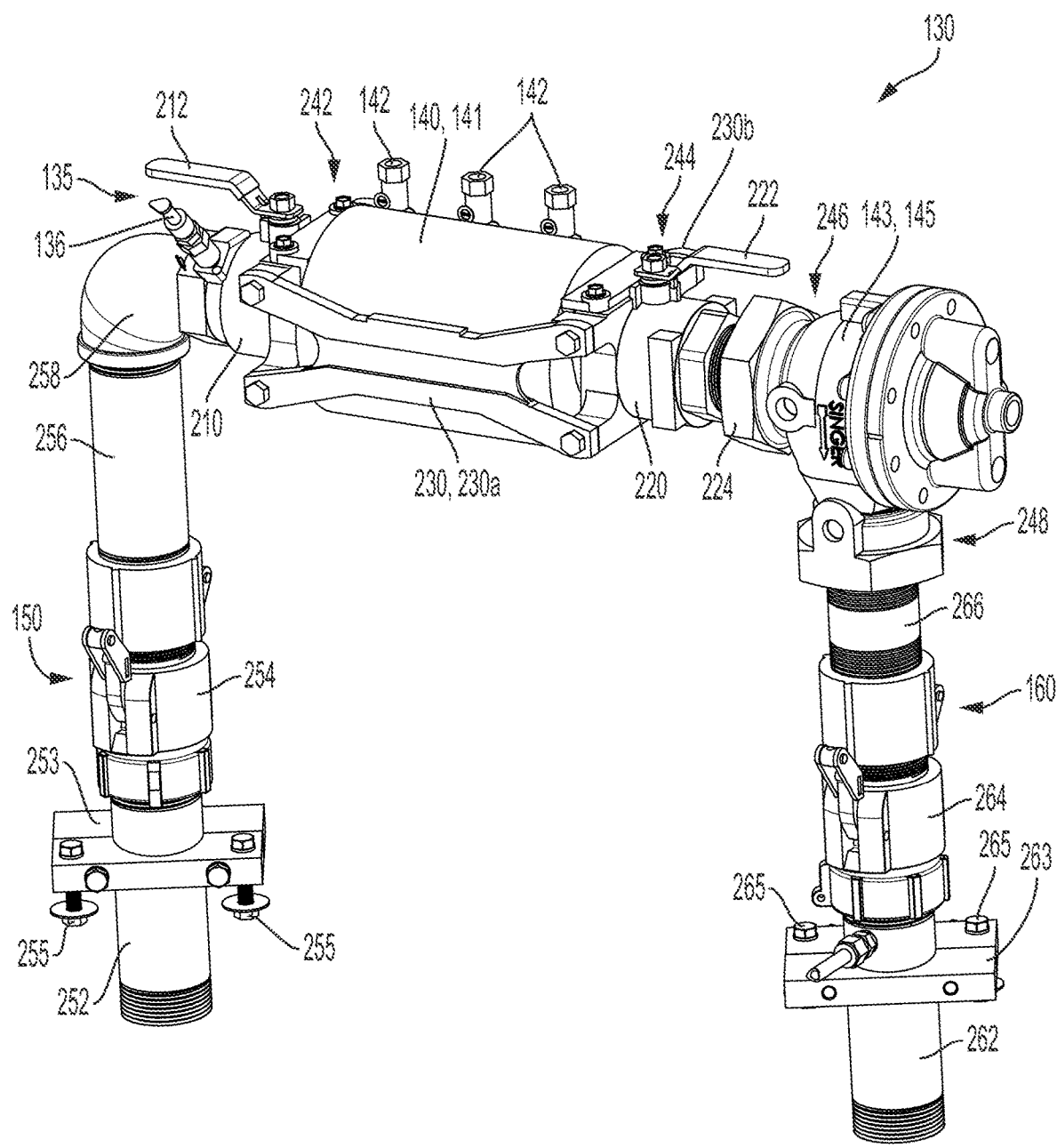
FIG. 2 is a top perspective view of a fluid routing assembly of the flushing system of FIG. 1A, wherein the fluid routing assembly comprises backflow preventer and a valve.

FIG. 2 illustrates a top perspective view of the fluid routing assembly 130. As shown, the inlet pathway 150 can comprise an inlet conduit 252 that can be connected to the fluid system and can provide a path for the fluid in the fluid system to enter the fluid routing assembly 130. The inlet conduit 252 can be configured to extend into the interior cavity 115 through an inlet opening 532 (shown in FIG. 5) formed in the base 129 (shown in FIG. 1B) of the housing 110 (shown in FIG. 1A). In some aspects, an inlet mounting bracket 253 can be mounted to the inlet conduit 252, and the inlet mounting bracket 253 can be attached to the base 129 to secure the inlet conduit 252 to the housing 110. As shown, one or more fasteners, such as nut and bolt fasteners 255, may be provided for securing the inlet mounting bracket 253 to the base 129. In example aspects, the inlet pathway 150 can be configured to extend substantially upward, relative to the orientation shown, towards the upper end 124 (shown in FIG. 1A) of the sidewall enclosure 120 (shown in FIG. 1A). As shown, in the present aspect, an inlet connector 254 can be provided for connecting the inlet conduit 252 to an inlet pipe 256. In some aspects, one or both of the inlet conduit 252 and inlet pipe 256 can be threadably coupled to the inlet connector 254. An inlet elbow fitting 258 can be coupled to the inlet pipe 256 and can define a bend angle of about 90°. As such, the fluid can flow from the fluid system into the inlet conduit 252, and can then flow through the inlet connector 254, inlet pipe 256, and inlet elbow fitting 258. Example aspects of the inlet pathway 150 can comprise more or fewer components as needed to route the fluid to the backflow preventer 140.

Example aspects of the outlet pathway 160 can comprise an outlet conduit 262 that can provide a path for the fluid to exit the fluid routing assembly 130. In example aspects, the outlet conduit 262 can be connected to a fluid discharge location, such as sewage system, storm system, swale, retention system, or the like. In some aspects, as described above, the fluid flushed through the flushing system 100 can be routed through the dechlorination unit 170 (shown in FIG. 1A) prior to being discharged at the fluid discharge location. The outlet conduit 262 can be configured to extend into the interior cavity 115 through an outlet opening 534 (shown in FIG. 5) formed in the base 129 (shown in FIG. 1B) of the housing 110 (shown in FIG. 1A). In some aspects, an outlet mounting bracket 263 can be mounted to the outlet conduit 262, and the outlet mounting bracket 263 can be attached to the base 129 to secure the outlet conduit 262 to the housing 110. As shown, one or more fasteners, such as nut and bolt fasteners 265, may be provided for securing the outlet mounting bracket 263 to the base 129. According to some example aspects, the outlet pathway 160 can be configured to extend substantially upward, relative to the orientation shown, towards the upper end 124 of the sidewall enclosure 120. In the present aspect, the outlet pathway 160 can further comprise an outlet connector 264 for connecting the outlet conduit 262 to an outlet pipe 266. In some aspects, the outlet conduit 262 and outlet pipe 266 can be threadably coupled to the outlet connector 264. As such, as shown, the fluid in the flushing system 100 can exit the flushing system 100 by flowing into the outlet pipe 266, and then through the outlet connector 264 and the outlet conduit 262. Example aspects of the outlet pathway 160 can comprise more or fewer components as needed to route the fluid out of the flushing system 100. In other aspects, either or both of the inlet pathway 150 and outlet pathway 160 comprise any suitable configuration for routing the fluid into and out of the flushing system 100.

According to example aspects, a backflow preventer inlet 210 can oriented between and coupled to the inlet elbow fitting 258 and to an inlet end 242 of the backflow preventer 140, such that fluid can flow from the inlet elbow fitting 258, through the backflow preventer inlet 210, and into the backflow preventer 140. In some aspects, the backflow preventer inlet 210 can be threadably coupled to the inlet elbow fitting 258. As shown, the sampling port 135 extend from and can be in fluid communication with the backflow preventer inlet 210. As such, the sampling port 135 can be oriented proximate to the upper end 124 of the sidewall enclosure 120, such that the sampling port 135 can be easily accessed when the lid 425 is removed from the housing 110 to allow access to the interior cavity 115. In other aspects, however, the sampling port 135 can be oriented at any other suitable location in the flushing system 100. Additionally, as shown, the backflow preventer inlet 210 can comprise an inlet shutoff valve 212, such as a ball valve, which, in the present aspect, can be manually operated to selectively shut off fluid flow into the backflow preventer 140.

Example aspects of the fluid routing assembly 130 can further comprise a backflow preventer outlet 220 oriented between and coupled to an outlet end 244 of the backflow preventer 140 and an inlet end 246 of the adjustable flow valve 145. Thus, fluid can be configured to flow from the backflow preventer 140, through the backflow preventer outlet 220, and into the adjustable flow valve 145. Furthermore, as shown, the outlet pipe 266 of the outlet pathway 160 can be connected to an outlet end 248 of the adjustable flow valve 145, such that fluid can flow out of the adjustable flow valve 145 at the outlet end 248 and into the outlet pathway 160. In some aspects, the backflow preventer outlet 220 can be threadably coupled to a threaded valve connector 224, and the threaded valve connector 224 can be threadably coupled to the inlet end 246 of the adjustable flow valve 145. Similar to the backflow preventer inlet 210, the backflow preventer outlet 220 can comprise an outlet shutoff valve 222, such as a ball valve, which can be manually operated to selectively shut of fluid flow out of the backflow preventer 140. In other aspects, the inlet and outlet shutoff valves 212, 222 may not be manually-operated, and may instead be automatically operated. Each of the backflow preventer 140 and adjustable flow valve 145 can be oriented proximate to the upper end 124 of the sidewall enclosure 120, to allow for easy access thereto through the access opening 128 for operation of the inlet and outlet shutoff valves 212, 222 or for the repair or replacement of parts. Furthermore, according to some example aspects, the backflow preventer inlet 210 can be coupled to the backflow preventer outlet 220 by one or more connecting brackets 230. For example, as shown, the backflow preventer inlet 210 can be coupled to the backflow preventer outlet 220 by a first connecting bracket 230a and a second connecting bracket 230b. In the present view, the second connecting bracket 230b is largely hidden from view by the backflow preventer 140, but can be substantially the same as the first connecting bracket 230a.

Figure 3:
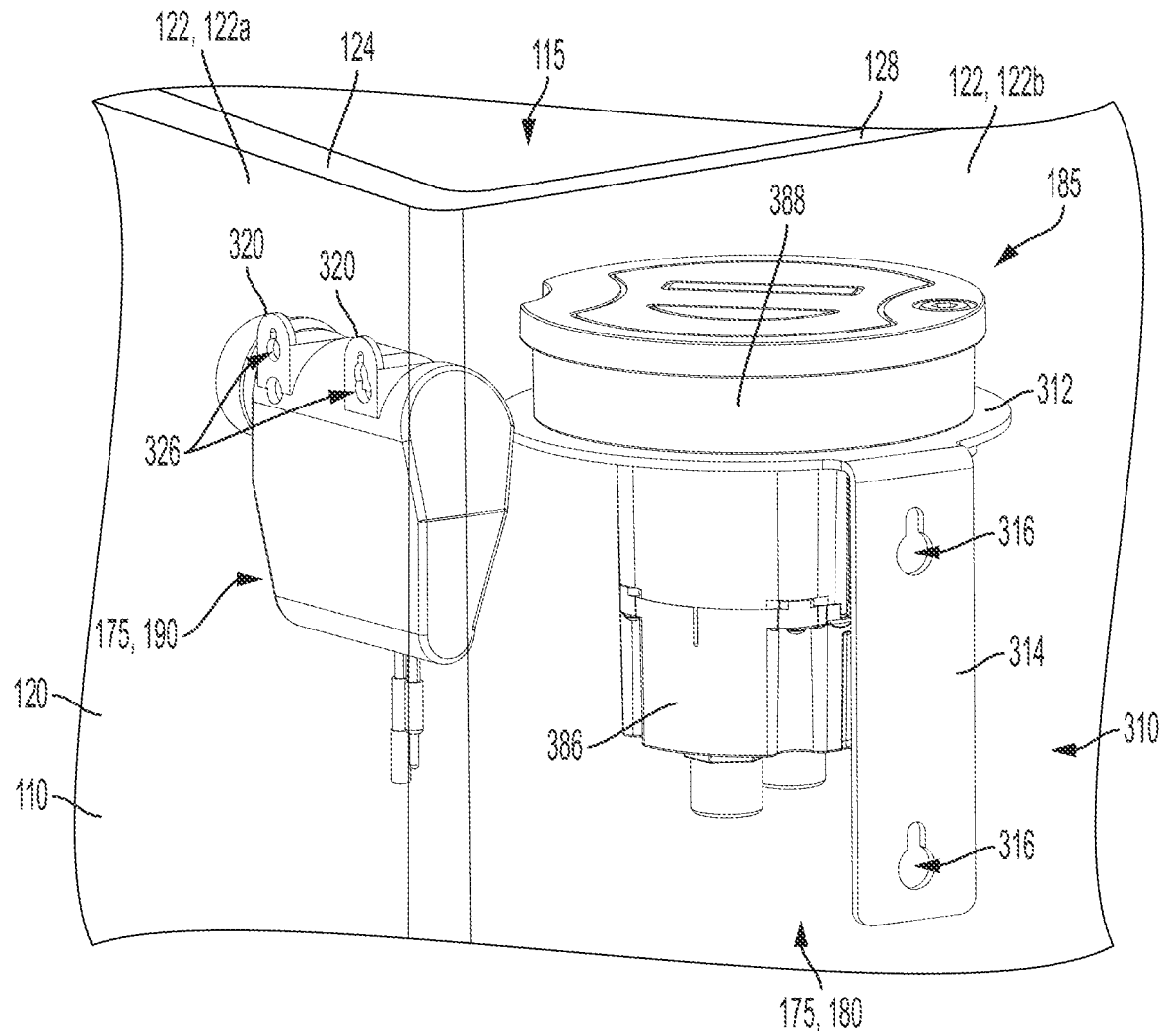
FIG. 3 is a rear perspective view of a pressure monitoring unit and a Bluetooth® controller of the flushing system of FIG. 1A.

FIG. 3 illustrates the Bluetooth® controller 190 and pressure monitoring unit 185 mounted to the sidewall enclosure 120 of the housing 110. The sidewall enclosure 120 is again illustrated as transparent for visibility into the interior cavity 115. As described above, other aspects of the flushing system 100 may comprise only one of the Bluetooth® controller 190 and the pressure monitoring unit 185. According to example aspects, the pressure monitoring system 180 can comprise an antenna configured to send pressure signals 685 (shown in FIG. 6) representative of the pressure data received from the pressure sensor 182 (shown in FIG. 1B) to a designated external electronic device(s) 620 (shown in FIG. 6), which as described, may be or may include the remote operation device 610. Optionally, the housing 110 can be formed from a non-ferrous material, so that the material does not interfere with the ability of the antenna to send the pressure signals 685 and other signals externally. In the present aspect, the antenna can be configured to send signals, including the pressure signals 685, over a cellular network. However, in other aspects, signals can be sent from the pressure monitoring unit 185 over wifi, ethernet, Bluetooth®, or any other suitable wireless technology. The pressure monitoring unit 185 may be configured to report the pressure data externally continually, at user-defined intervals, or may be configured to report the pressure data solely when an anomaly occurs, such as a spike in pressure.

In some aspects, the antenna can also allow an operator to remotely control the operation of the flushing system 100. For example, in aspects comprising the solenoid-operated adjustable flow valve 145, the antenna can allow the operator to wirelessly control the solenoid 146 (shown in FIG. 1B) to selectively orient the adjustable flow valve 145 in the open, closed, and partially-open configurations. As described above, the antenna can be wirelessly connected to an app or program on the remote operation device 610 through which the operator can control the flushing system 100. In such aspects, it may not be necessary to include the Bluetooth® controller 190 in the flushing system 100. Furthermore, in some aspects, the adjustable flow valve 145 can also be programmed to automatically open and close periodically for routine flushing of the fluid system. In example aspects, when the adjustable flow valve 145 moves to the open or partially open configuration, allowing fluid to flow through the flushing system 100, the pressure of the fluid can drop and a pressure signal 685 can be sent by the antenna relaying the pressure drop information to the designated external electronic device(s) 620. In some aspects, the external electronic device(s) 620 can be or can include the remote operation device 610. Similarly, the pressure of the fluid can increase when the adjustable flow valve 145 moves to the closed configuration, and a pressure signal 685 can sent relaying the pressure increase information to the designated external electronic device(s) 620.

According to example aspects, the antenna may allow for remote control of various other features of the flushing system 100. Furthermore, in addition to pressure information, the antenna may be configured to communicate information related to other aspects of the flushing system 100 or the fluid therein to one or more external electronic device(s) 620. For example, the flushing system 100 may comprise a temperature sensor 184 configured to detect a temperature of the fluid and the antenna can be configured to send a temperature signal representative of the detected temperature to the designated electronic device(s) 620. In the present aspect, the temperature sensor 184 can be housed with the pressure sensor 182 and can be wired to the pressure monitoring unit 185 by the wire 183. Example aspects of the flushing system 100 may further comprise various other sensors, detectors, and/or measurement tools for sensing, detecting, and/or measuring other properties of the fluid, such as, for example, fluid quality, flow rate, pH level, chlorine level, disinfectant level, turbidity, and the like. The antenna can communicate information related to detected fluid property or properties via a fluid property signal. The antenna can also be configured to communicate information such as the concentration of the dechlorination substances (e.g., sodium sulfite, ascorbic acid) within the dechlorination unit 170, a status of the strainer in the adjustable flow valve 145, etc. In aspects wherein the Bluetooth® controller 190 is also provided, the Bluetooth® controller 190 may allow for remote control the same or different features of the flushing system 100 and/or communication of the same or different information.

According to example aspects, the pressure monitoring unit 185 can be mounted to the sidewall enclosure 120 by a pressure monitor bracket 310 and the Bluetooth® controller 190 can be mounted to the sidewall enclosure 120 by one or more mounting tabs 320. In the present aspect, the Bluetooth® controller 190 can be mounted to a first one of the sidewalls 122a of the sidewall enclosure 120 and the pressure monitoring unit 185 can be mounted to a second one of the sidewalls 122b. In other aspects, the Bluetooth® controller 190 and sidewall enclosure 120 can be mounted at any other suitable location within the interior cavity 115, including any location on the sidewall enclosure 120, lid 425 (shown in FIG. 4), base 129 (shown in FIG. 1B), and fluid routing assembly 130 (shown in FIG. 1A). As shown, example aspects of the pressure monitor bracket 310 comprise a bracket ring 312 and a bracket mounting flange 314. The bracket ring 312 can wrap around a body 386 of the pressure monitoring unit 185 and a head 388 of the pressure monitoring unit 185 can rest on the bracket ring 312. The bracket mounting flange 314 can abut the second sidewall 122b of the sidewall enclosure 120 and can define one or more fastener holes 316 formed therethrough, as shown. A fastener such as, for example, a screw, can extend through each of the fastener holes 316 and can engage the second sidewall 122b to mount the pressure monitor bracket 310 to the sidewall enclosure 120. Example aspects of the Bluetooth® controller 190 can comprise two of the mounting tabs 320 formed monolithically with the Bluetooth® controller 190, and the mounting tabs 320 can abut the first sidewall 122a of the sidewall enclosure 120. In other aspects, the mounting tabs 320 can be formed separately from the Bluetooth® controller 190 and attached thereto. Each of the mounting tabs 320 can define a fastener hole 326 formed therethrough, and a fastener, such as a screw, for example, can extend through each of the fastener holes 326 of the mounting tabs 320 and can engage the first sidewall 122a to mount the Bluetooth® controller 190 to the sidewall enclosure 120. In other aspects, the Bluetooth® controller 190 and pressure monitoring unit 185 can be secured to the housing 110 or elsewhere in the interior cavity 115 by any other suitable attachments mechanisms known in the art.

FIG. 4 illustrates a top perspective view of the housing 110 with the lid 425 covering access opening 128 (shown in FIG. 1A) to prevent access to the interior cavity 115 (shown in FIG. 1A). In example aspects, the lid 425 may be configured to rest on a rim or stops of the sidewall enclosure 120 to support the lid 425 proximate to the upper end 124 of the sidewall enclosure 120. In other aspects, a friction fit may be defined between the lid 425 and sidewall enclosure 120 to secure the lid 425 in position at the upper end 124, and in still other aspects, the housing 110 can define any other suitable configuration for retaining the lid 425 at the upper end 124 of the sidewall enclosure 120. As described above, in example aspect, the lid 425 may be removable from the sidewall enclosure 120 to uncover the access opening 128 and allow access to the interior cavity 115. For example, the lid 425 may be removed for the manual operation of the inlet and outlet shutoff valves 212, 222 (shown in FIG. 2), for obtaining fluid samples from the sampling port 135 (shown in FIG. 1A), for replacing the strainer in the adjustable flow valve 145 (shown in FIG. 1A), for adding additional dechlorination tablets to the dechlorination unit 170 shown in FIG. 1A), for repairing or replacing any of the components housed within the interior cavity 115, or for any other suitable reason. Example aspects of the lid 425 may comprise a handle or handles to facilitate lifting the lid 425 away from the sidewall enclosure 120. Moreover, in some aspects, a tool may be required to remove the lid 425 in order to prohibit manual removal of the lid 425 and prevent unintentional removal of the lid 425 and/or tampering with the flushing system 100. In other aspects, the lid 425 may not be removable from housing 110.

Figure 5:
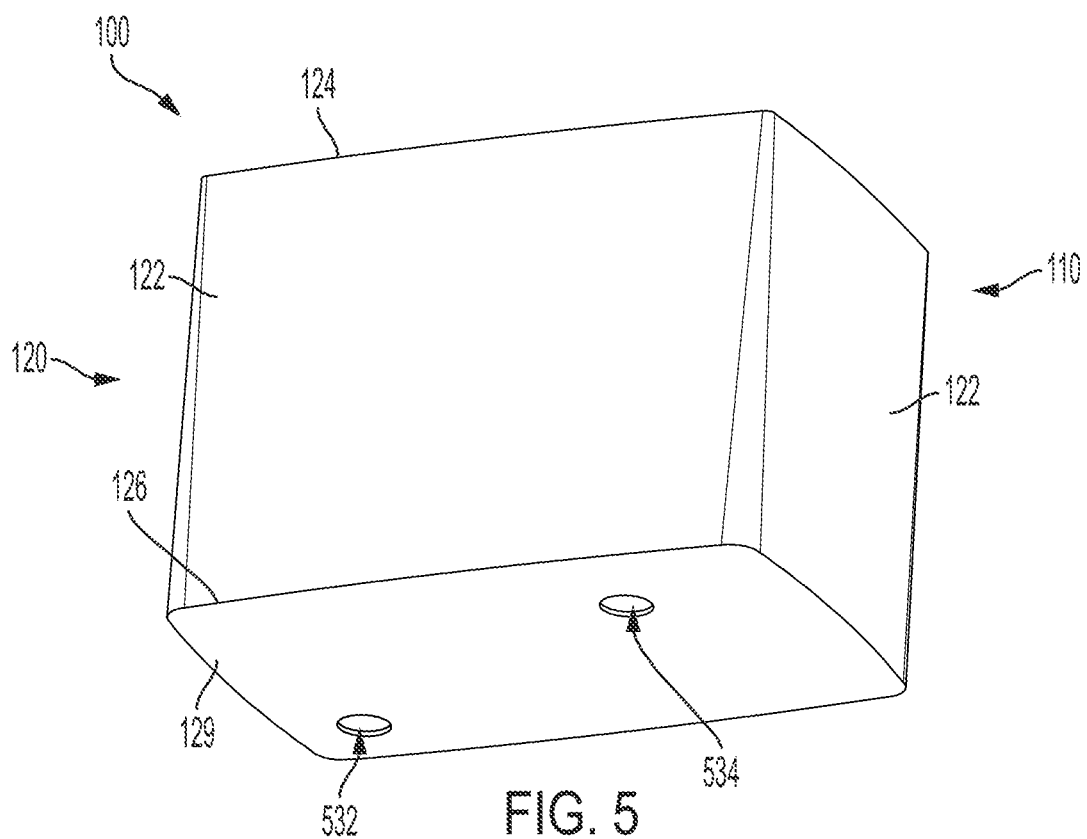
FIG. 5 is a bottom perspective view of the housing of FIG. 4.

FIG. 5 illustrates a bottom perspective view of the housing 110, illustrating the base 129 oriented at the lower end 126 of the sidewall enclosure 120. In some aspects, the base 129 can be monolithically formed with sidewall enclosure 120, and in other aspects, the base 129 can be separately formed from the sidewall enclosure 120 and attached thereto. As such, some example aspects of the base 129 can be removable from the sidewall enclosure 120, while in other aspects, the base 129 is not removable. As shown, example aspects of the base 129 can define the inlet opening 532 formed therethrough through which the inlet conduit 252 (shown in FIG. 2) can extend and the outlet opening 534 formed therethrough through which the outlet conduit 262 (shown in FIG. 2) can extend. Other aspects of the base 129 may comprise additional openings to allow additional components of the flushing system 100, or other systems, to extend into and/or out of the interior cavity 115 (shown in FIG. 1A).

FIG. 6 is a system diagram illustrating a method of operating the flushing system 100, according to an example aspect of the disclosure. Example aspects of the method can include providing the flushing system 100 comprising the fluid routing assembly 130 (shown in FIG. 1A) and the control device 175, wherein the fluid routing assembly 130 can comprise the valve 143. The valve can be configurable in the open configuration, wherein fluid is permitted to flow through the fluid routing assembly 130, and a closed configuration, wherein the fluid is prohibited from flowing through the fluid routing assembly 130. The method can further comprising remotely sending a control signal 615 to the control device 175. For example, the control signal 615 can be sent by the remote operation device 610. Example aspects of the method can also comprise actuating the valve 143 between the open configuration and closed configuration with the control device 175 in response to the control signal 615, wherein, in some aspects, the control device 175 can wirelessly actuate the valve 143 by sending an actuation signal 645 to the valve 143. In some aspects, the method can further comprise detecting a pressure of the fluid with the pressure sensor 182, and sending the pressure signal 685 with the control device 175, the pressure signal 685 representative of the pressure detected by the pressure sensor 182. According to example aspects, the pressure signal 685 can be sent to an external electronic device 620 or devices, and in some aspects, the external electronic devices(s) 620 can be or can comprise the remote operation device 610. In example aspects, the pressure sensor 182 can send pressure data wirelessly to the control device 175, while in other aspects, the pressure sensor 182 can be wired to the control device 175 and can transmit data to the control device 175 through a pressure sensor wire 640, as shown.

One should note that conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more particular embodiments or that one or more particular embodiments necessarily include logic for deciding, with or without user input or prompting, whether these features, elements and/or steps are included or are to be performed in any particular embodiment.

It should be emphasized that the above-described embodiments are merely possible examples of implementations, merely set forth for a clear understanding of the principles of the present disclosure. Any process descriptions or blocks in flow diagrams should be understood as representing modules, segments, or portions of code which include one or more executable instructions for implementing specific logical functions or steps in the process, and alternate implementations are included in which functions may not be included or executed at all, may be executed out of order from that shown or discussed, including substantially concurrently or in reverse order, depending on the functionality involved, as would be understood by those reasonably skilled in the art of the present disclosure. Many variations and modifications may be made to the above-described embodiment(s) without departing substantially from the spirit and principles of the present disclosure. Further, the scope of the present disclosure is intended to cover any and all combinations and sub-combinations of all elements, features, and aspects discussed above. All such modifications and variations are intended to be included herein within the scope of the present disclosure, and all possible claims to individual aspects or combinations of elements or steps are intended to be supported by the present disclosure.

That which is claimed is:

1. A fluid flushing system comprising:
a sampling port comprising a sampling conduit configured to dispense a sample of a fluid in the fluid flushing assembly;
a valve configurable in an open valve configuration, wherein the fluid is permitted to flow through the fluid flushing system, and a closed valve configuration, wherein the fluid is prohibited from flowing through the fluid flushing system;
a backflow preventer disposed between the sampling port and the valve, the backflow preventer configured to allow the fluid to flow in a first direction through the fluid flushing system towards the valve and to prevent the fluid from flowing in an opposite second direction through the fluid flushing system towards the sampling port;

a housing comprising a base and defining an interior cavity, wherein the sampling port, the valve, and the backflow preventer are oriented within the housing; and an inlet pathway configured to route the fluid from a fluid system into the fluid flushing system and an outlet pathway configured to route the fluid out of the fluid flushing system;

wherein:

the sampling port is disposed between the inlet pathway and the backflow preventer;

the valve is disposed between the backflow preventer and the outlet pathway;

the inlet pathway comprises an inlet conduit extending into the interior cavity through an inlet opening in the base; and the outlet pathway comprises an outlet conduit extending into the interior cavity through an outlet opening in the base.

2. The fluid flushing system of claim 1, further comprising a pressure monitoring system, the pressure monitoring system comprising a pressure sensor mounted to the fluid flushing system and configured to detect a pressure of the fluid in the fluid flushing system.

3. The fluid flushing system of claim 2, wherein the pressure monitoring system further comprises a pressure monitoring unit wired to the pressure sensor, the pressure monitoring unit comprising a processing unit and an antenna, the processing unit configured to process pressure data from the pressure sensor and to relay the pressure data to the antenna, the antenna configured to send a pressure signal representative of the pressure detected by the pressure sensor.

4. The fluid flushing system of claim 3, wherein the antenna is further configured to wirelessly receive a control signal from a remote operation device and to actuate the valve between the open valve configuration and the closed valve configuration in response to the control signal.

5. The fluid flushing system of claim 4, further comprising a remote operation device wirelessly connected to the valve and configured to actuate the valve between the open valve configuration and the closed valve configuration.

6. The fluid flushing system of claim 3, further comprising a temperature sensor configured to detect a temperature of the fluid in the fluid flushing system, and wherein the antenna is configured to send a temperature signal representative of the temperature detected by the temperature sensor.

7. The fluid flushing system of claim 1, further comprising an inlet mounting bracket mounted to the inlet conduit and an outlet mounting bracket mounted to the outlet conduit, the inlet mounting bracket attached to the base to secure the inlet conduit to the housing, the outlet mounting bracket attached to the base to secure the outlet conduit to the housing.

8. The fluid flushing system of claim 1, wherein:

the housing further comprises a sidewall enclosure and a lid:

the sidewall enclosure defines an access opening allowing access to the interior cavity; and the lid is configurable in a closed lid configuration, wherein the lid covers the access opening, and an open lid configuration, wherein the lid is removed from the housing and the access opening is uncovered to permit access to the interior cavity.

9. The fluid flushing system of claim 8, wherein the access opening is formed at an upper end of the sidewall enclosure, and wherein the sampling port is oriented proximate to the upper end of the sidewall enclosure to facilitate accessing the sampling port through the access opening.

10. The fluid flushing system of claim 1, wherein:

the backflow preventer defines a backflow preventer inlet and a backflow preventer outlet;

the backflow preventer comprises an inlet shutoff valve at the backflow preventer inlet operable to prevent the fluid from flowing into the backflow preventer; and the backflow preventer comprises an outlet shutoff valve at the backflow preventer outlet operable to prevent the fluid from flowing out of the backflow preventer.

11. The fluid flushing system of claim 10, wherein the backflow preventer inlet is coupled to the backflow preventer outlet by a backflow connecting bracket.

12. The fluid flushing system of claim 10, wherein the backflow preventer comprises a plurality of relief valves spaced apart along the backflow preventer and configured to relieve air buildup within the backflow preventer.

13. A method of operating a fluid flushing system comprising:

providing the fluid flushing system comprising a housing comprising a base and defining an interior cavity, an inlet conduit extending into the interior cavity through an inlet opening defined in the base, an outlet conduit extending into the interior cavity through an outlet opening defined in the base, a backflow preventer disposed between the inlet conduit and the outlet conduit, and a flow valve disposed between the backflow preventer and the outlet conduit, wherein the backflow preventer is configured to allow a fluid to flow in a first direction through the fluid flushing system towards the flow valve and to prevent the fluid from flowing in an opposite second direction through the fluid flushing system towards the inlet conduit;

actuating a shutoff valve of the backflow preventer to an open configuration to allow the fluid to flow through the backflow preventer from the inlet conduit to the flow valve; and actuating the shutoff valve to a closed configuration to prohibit fluid from flowing through the backflow preventer.

14. The method of claim 13, wherein:

actuating the shutoff valve of the backflow preventer to the open configuration comprises manually actuating the shutoff valve to the open configuration; and actuating the shutoff valve to the closed configuration comprises manually actuating the shutoff valve to the closed configuration.

15. The method of claim 13, further comprising actuating the flow valve from a closed flow configuration to an open flow configuration when the shutoff valve of the backflow preventer is in the open configuration.

16. The method of claim 13, further comprising releasing air buildup within the backflow preventer through a relief valve of the backflow preventer.

17. The method of claim 13, wherein:

the backflow preventer defines a backflow preventer inlet and a backflow preventer outlet;

the shutoff valve is an inlet shutoff valve at the backflow preventer inlet that is operable to prevent the fluid from flowing into the backflow preventer from the inlet conduit; and the backflow preventer further comprises an outlet shutoff valve at the backflow preventer outlet operable to prevent the fluid from flowing out of the backflow preventer to the flow valve.

* * * * *